US012784071B2

(12) United States Patent
Sethuraman et al.

(10) Patent No.: US 12,784,071 B2
(45) Date of Patent: Nov. 3, 2026

(54) METHOD AND SYSTEM FOR COMPUTATION OF PRICE ELASTICITY FOR OPTIMAL PRICING OF PRODUCTS

(71) Applicant: Tata Consultancy Services Limited, Mumbai (IN)

(72) Inventors: Srividhya Sethuraman, Chennai (IN); Uma Maheswari Govindaraju, Chennai (IN); Sharadha Ramanan, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 185 days.

(21) Appl. No.: 18/512,854

(22) Filed: Nov. 17, 2023

(65) Prior Publication Data

US 2024/0202760 A1 Jun. 20, 2024

(30) Foreign Application Priority Data

Nov. 21, 2022 (IN) ............................ 202221066850

(51) Int. Cl.
*G06Q 30/0201* (2023.01)
*G06N 20/20* (2019.01)

(52) U.S. Cl.
CPC ......... *G06Q 30/0206* (2013.01); *G06N 20/20* (2019.01)

(58) Field of Classification Search
CPC ...... G06Q 30/0206; G06N 3/088; G06N 3/09; G06N 3/092; G06N 20/20

(Continued)

(56) References Cited

U.S. PATENT DOCUMENTS 11,429,992 B2 8/2022 Ganti Mahapatruni et al.
2003/0177103 A1 * 9/2003 Ivanov .................. G06Q 30/02 705/400

(Continued)

FOREIGN PATENT DOCUMENTS

IN 202121028763 7/2022

OTHER PUBLICATIONS

Chengcheng Liu, Mátyás A. Sustik; "Elasticity Based Demand Forecasting and Price Optimization for Online Retail"; arXiv:2106.08274; Jun. 17, 2021. (Year: 2021).*

(Continued)

*Primary Examiner* — Dione N. Simpson
(74) *Attorney, Agent, or Firm* — Finnegan, Henderson, Farabow, Garrett & Dunner, LLP

(57) ABSTRACT

In retail industry, retailers need accurate price elasticity (PE) values to offer optimal prices for products to business constraints. Existing approaches provide approximate PE values leading to suboptimal price recommendations. This disclosure relates to method of computing PE values for optimal pricing based on sequential price elasticity computation is provided. Transaction data and attribute data of products are processed to obtain preprocessed data. One or more selected models are determined based on the preprocessed data. Priors at one or more levels are computed and likelihoods are computed based on one or more monetary objectives from historical transaction data of the products. One or more parameters of one or more price elasticity distributions are iteratively determined through one or more component approaches based on the priors and the likelihoods. The PE values are derived based on ensemble techniques applied to one or more parameters of the one or more PE distributions.

17 Claims, 8 Drawing Sheets

(58) Field of Classification Search
USPC .......................................................... 705/7.35
See application file for complete search history.

(56) References Cited

U.S. PATENT DOCUMENTS

| | | | | |
|---|---|---|---|---|
| 2008/0040203 | A1 | 2/2008 | Ivanov et al. | |
| 2019/0172082 | A1 * | 6/2019 | Ganti Mahapatruni . | G06N 5/01 |
| 2021/0110429 | A1 * | 4/2021 | Keng ................. | G06Q 30/0244 |
| 2021/0304243 | A1 | 9/2021 | Le et al. | |

OTHER PUBLICATIONS

Ganti et al., "Thompson Sampling for Dynamic Pricing," (2018).

* cited by examiner

METHOD AND SYSTEM FOR COMPUTATION OF PRICE ELASTICITY FOR OPTIMAL PRICING OF PRODUCTS

PRIORITY CLAIM

This U.S. patent application claims priority under 35 U.S.C. § 119 to: India application No. 202221066850, filed on Nov. 21, 2022. The entire contents of the aforementioned application are incorporated herein by reference.

TECHNICAL FIELD

This disclosure relates generally to a pricing system, and, more particularly, to a method and system for computation of price elasticity for optimal pricing of products.

BACKGROUND

In the retail industry, retailers want to quantify the relationship of price with sales for all their products. The retailers need accurate price elasticity coefficients or price elasticity (PE) values to offer optimal prices for their items subject to business constraints specific to each phase of sales. The retailers need to correct the price elasticity (PE) values for their products for recommendation of optimal regular, promotional, and markdown pricing to maximize their sales units and revenue in these periods. The computation of the accurate price elasticity values is critical for the retailer in inventory planning, allocation, and re-distribution. The PE values in this context, refers to price elasticity of demand. The PE values are traditionally computed using regression-based models that use historical data. For products having enough price changes in history these methods can be readily used. The computation of the price elasticity value is particularly challenging for products with very few price changes in historical sales data, items with very few sales points, new items and for items with no history. Most existing methods are based on machine learning techniques fail in these scenarios where data is scarce.

Further, the PE values of most items vary across an item's lifecycle. Hence it is very much necessary to understand a drift in the price elasticity values to price products in a more meaningful manner across distinct phases of sales. Specifically, performance of most items, including seasonal and fashion items vary a lot within a season. These variations and uncertainties are not addressed by existing regression-based methods. In practice, similar products are identified for such items and their PE values are used. Typically, the PE values lying within the range [−3, −1] are used for most items. A price elasticity (PE) model had to reflect the variations occurring across time. PE coefficients from the PE model has been utilized to obtain optimal regular pricing that maximizes revenue, and optimal in-season markdown pricing that results in achieving target sell-through by end of season. The PE model also has to capture behavior of seasonal and fashion items showcasing limited price changes, and highly volatile sales. Further, PE computation system needs to adapt to the changes in environment. Typically, the end-to-end functioning of a passive learning approach for markdown pricing in which the price elasticity estimation component involves models such as regression, which tends to fail when there aren't many price changes. For real-world data, the price elasticity values for most of the products are approximate and computed in an ad-hoc manner. The approximate PE values lead to suboptimal price recommendations. Thus, practical, and good PE computation is a real challenge for retailers.

SUMMARY

Embodiments of the present disclosure present technological improvements as solutions to one or more of the above-mentioned technical problems recognized by the inventors in conventional systems. For example, in one aspect, a processor implemented method of computing price elasticity (PE) values for optimal pricing based on sequential price elasticity computation is provided. The processor implemented method includes at least one of: receiving, via one or more hardware processors, (i) a transaction data, or (ii) an attribute data associated with a plurality of products from a user, and (iii) a combination thereof as an input data; processing, via the one or more hardware processors, the input data to obtain preprocessed data; determining, via the one or more hardware processors, one or more selected models based on the one or more model selection parameters; computing, via the one or more hardware processors, one or more priors at one or more levels by modeling with one or more parameters derived through the input data, and one or more likelihoods based on a historical transaction data; iteratively determining, via the one or more hardware processors, one or more parameters associated with one or more price elasticity distributions through one or more unsupervised reinforcement learning models based on the one or more priors and the one or more likelihoods; and deriving, via the one or more hardware processors, one or more price elasticity values based on at least one ensemble techniques applied to the one or more parameters associated with the one or more price elasticity distributions. The preprocessed data includes one or more model selection parameters. The one or more unsupervised reinforcement learning models corresponds to one or more component approaches. The one or more component approaches corresponds to (a) a first component approach, or (b) a second component approach, or (c) a third component approach, or (d) a fourth component approach, and combination thereof.

In an embodiment, the input data includes transaction date, a stock keeping unit (SKU) ID, store ID, (d) price, quantity, revenue, phase of sales, SKU list, data associated with one or more monetary objectives, a threshold for Akaike Information Criterion (AIC), and a Bayesian Information Criterion (BIC), error and estimation scores, threshold for variance, number of SKUs required to satisfy threshold set for variance, number of iterations to wait for a stopping condition to be enforced, and a flag input for prior calculation approach. In an embodiment, the one or more priors are computed based on: (a) a SKU level with a high variance, (b) group of similar products, (c) a merchandise hierarchy level, (d) similar selling characteristics of group of products, (e) selling range of group of products, and (f) combination thereof. In an embodiment, the one or more parameters for the one or more price elasticity distributions are computed through the first component approach, further includes: (a) the one or more priors are computed from one or more historical sales data, (b) the one or more likelihoods are determined as a Gaussian distribution with mean and variance of one or more monetary objectives chosen based on the input data for a corresponding selling duration of the one or more products from the one or more historical sales data, and (c) a demand is forecasted based on sales distribution corresponding to one or more products and a sampling posterior price elasticity distribution based on the one or more priors and the one or more likelihoods. In an embodiment, the one or more priors are generated as a Gaussian distribution with mean as a value of price elasticity, a standard error as a variance for one or more independent products, and a covariance matrix for one or more dependent products. In an embodiment, the one or more parameters for the one or more price elasticity distributions are computed through the second component approach further includes: (a) the one or more priors are computed from one or more historical sales data, (b) the one or more likelihoods are determined as a Gaussian distribution with mean and variance of one or more monetary objectives chosen based on the input data for a corresponding selling duration of the one or more products from the one or more historical sales data, and (c) a demand is forecasted based on one or more machine learning models trained on in-season transaction data and the historical sales data corresponding to the one or more products, and the sampling posterior price elasticity distribution based on the one or more priors and the one or more likelihoods. In an embodiment, the one or more priors are generated as a Gaussian distribution with mean as a value of price elasticity, a standard error as a variance for one or more independent products, and a covariance matrix for one or more dependent products. In an embodiment, the one or more parameters for the one or more price elasticity distributions are computed through the third component approach, further includes: (a) the one or more priors are computed from one or more historical sales data, (b) the one or more likelihoods are determined as a Gaussian distribution with mean and variance of one or more monetary objectives chosen based on the input data for a corresponding selling duration of the one or more products from the one or more historical sales data, and (c) a demand is forecasted based on one or more deep learning models trained on in-season transaction data and the one or more historical sales data corresponding to the one or more products, and the sampling posterior price elasticity distribution based on the one or more priors and the one or more likelihoods. In an embodiment, the one or more priors are generated as a Gaussian distribution with mean as a value of price elasticity, a standard error as a variance for one or more independent products, and a covariance matrix for one or more dependent products. In an embodiment, the one or more parameters for the one or more price elasticity distributions computed through the fourth component approach, further includes: (a) the one or more priors are computed from one or more historical sales data, (b) the one or more likelihoods are determined as a Gaussian distribution with mean and variance of one or more monetary objectives chosen based on the input data for a corresponding selling duration of the one or more products from the one or more historical sales data; and (c) a demand is forecasted based on the sales distribution corresponding to the one or more products, and the sampling posterior price elasticity distribution based on the one or more priors and the one or more likelihoods. In an embodiment, the one or more priors are generated as a Gaussian distribution with mean as a value of price elasticity, a standard error as a variance for one or more independent products, and a covariance matrix for one or more dependent products. In an embodiment, a Markov Chain Monte Carlo (MCMC) based sampling is further employed on the posterior price elasticity distribution to compute a representative price elasticity value.

In another aspect, there is provided a system for computation of price elasticity (PE) values for optimal pricing based on sequential price elasticity computation) The system includes a memory storing instructions; one or more communication interfaces; and one or more hardware processors coupled to the memory via the one or more communication interfaces, wherein the one or more hardware processors are configured by the instructions to: receive, (i) a transaction data, or (ii) an attribute data associated with a plurality of products from a user, and (iii) a combination thereof as an input data; process, the input data to obtain preprocessed data; determine, one or more selected models based on the one or more model selection parameters; compute, one or more priors at one or more levels by modeling with one or more parameters derived through the input data, and one or more likelihoods based on a historical transaction data; iteratively determine, one or more parameters associated with one or more price elasticity distribution through one or more unsupervised reinforcement learning models based on the one or more priors and the one or more likelihoods; and derive, one or more price elasticity values based on at least one ensemble techniques applied to the one or more parameters associated with the one or more price elasticity distributions. The preprocessed data includes one or more model selection parameters. The one or more unsupervised reinforcement learning models corresponds to one or more component approaches. The one or more component approaches corresponds to (a) a first component approach, or (b) a second component approach, or (c) a third component approach, or (d) a fourth component approach, and combination thereof.

In an embodiment, the input data includes transaction date, a stock keeping unit (SKU) ID, store ID, (d) price, quantity, revenue, phase of sales, SKU list, data associated with one or more monetary objectives, a threshold for Akaike Information Criterion (AIC), and a Bayesian Information Criterion (BIC), error and estimation scores, threshold for variance, number of SKUs required to satisfy threshold set for variance, number of iterations to wait for a stopping condition to be enforced, and a flag input for prior calculation approach. In an embodiment, the one or more priors are computed based on: (a) a SKU level with a high variance, (b) group of similar products, (c) a merchandise hierarchy level, (d) similar selling characteristics of group of products, (e) selling range of group of products, and (f) combination thereof. In an embodiment, the one or more parameters for the one or more price elasticity distributions are computed through the first component approach, further includes: (a) the one or more priors are computed from one or more historical sales data, (b) the one or more likelihoods are determined as a Gaussian distribution with mean and variance of one or more monetary objectives chosen based on the input data for a corresponding selling duration of the one or more products from the one or more historical sales data, and (c) a demand is forecasted based on sales distribution corresponding to one or more products and a sampling posterior price elasticity distribution based on the one or more priors and the one or more likelihoods. In an embodiment, the one or more priors are generated as a Gaussian distribution with mean as a value of price elasticity, a standard error as a variance for one or more independent products, and a covariance matrix for one or more dependent products. In an embodiment, the one or more parameters for the one or more price elasticity distributions are computed through the second component approach further includes: (a) the one or more priors are computed from one or more historical sales data, (b) the one or more likelihoods are determined as a Gaussian distribution with mean and variance of one or more monetary objectives chosen based on the input data for a corresponding selling duration of the one or more products from the one or more historical sales data, and (c) a demand is forecasted based on one or more machine learning models trained on in-season transaction data and the historical sales data corresponding to the one or more products, and the sampling posterior price elasticity distribution based on the one or more priors and the one or more likelihoods. In an embodiment, the one or more priors are generated as a Gaussian distribution with mean as a value of price elasticity, a standard error as a variance for one or more independent products, and a covariance matrix for one or more dependent products. In an embodiment, the one or more parameters for the one or more price elasticity distributions are computed through the third component approach, further includes: (a) the one or more priors are computed from one or more historical sales data, (b) the one or more likelihoods are determined as a Gaussian distribution with mean and variance of one or more monetary objectives chosen based on the input data for a corresponding selling duration of the one or more products from the one or more historical sales data, and (c) a demand is forecasted based on one or more deep learning models trained on in-season transaction data and the one or more historical sales data corresponding to the one or more products, and the sampling posterior price elasticity distribution based on the one or more priors and the one or more likelihoods. In an embodiment, the one or more priors are generated as a Gaussian distribution with mean as a value of price elasticity, a standard error as a variance for one or more independent products, and a covariance matrix for one or more dependent products. In an embodiment, the one or more parameters for the one or more price elasticity distributions computed through the fourth component approach, further includes: (a) the one or more priors are computed from one or more historical sales data, (b) the one or more likelihoods are determined as a Gaussian distribution with mean and variance of one or more monetary objectives chosen based on the input data for a corresponding selling duration of the one or more products from the one or more historical sales data; and (c) a demand is forecasted based on the sales distribution corresponding to the one or more products, and the sampling posterior price elasticity distribution based on the one or more priors and the one or more likelihoods. In an embodiment, the one or more priors are generated as a Gaussian distribution with mean as a value of price elasticity, a standard error as a variance for one or more independent products, and a covariance matrix for one or more dependent products. In an embodiment, a Markov Chain Monte Carlo (MCMC) based sampling is further employed on the posterior price elasticity distribution to compute a representative price elasticity value.

In yet another aspect, there are provided one or more non-transitory machine readable information storage mediums comprising one or more instructions which when executed by one or more hardware processors causes at least one of: receiving, (i) a transaction data, or (ii) an attribute data associated with a plurality of products from a user, and (iii) a combination thereof as an input data; processing, the input data to obtain preprocessed data; determining, one or more selected models based on the one or more model selection parameters; computing, one or more priors at one or more levels by modeling with one or more parameters derived through the input data, and one or more likelihoods based on a historical transaction data; iteratively determining, one or more parameters associated with one or more price elasticity distributions through one or more unsupervised reinforcement learning models based on the one or more priors and the one or more likelihoods; and deriving, one or more price elasticity values based on at least one ensemble techniques applied to the one or more parameters associated with the one or more price elasticity distributions. The preprocessed data includes one or more model selection parameters. The one or more unsupervised reinforcement learning models corresponds to one or more component approaches. The one or more component approaches corresponds to (a) a first component approach, or (b) a second component approach, or (c) a third component approach, or (d) a fourth component approach, and combination thereof.

In an embodiment, the input data includes transaction date, a stock keeping unit (SKU) ID, store ID, (d) price, quantity, revenue, phase of sales, SKU list, data associated with one or more monetary objectives, a threshold for Akaike Information Criterion (AIC), and a Bayesian Information Criterion (BIC), error and estimation scores, threshold for variance, number of SKUs required to satisfy threshold set for variance, number of iterations to wait for a stopping condition to be enforced, and a flag input for prior calculation approach. In an embodiment, the one or more priors are computed based on: (a) a SKU level with a high variance, (b) group of similar products, (c) a merchandise hierarchy level, (d) similar selling characteristics of group of products, (e) selling range of group of products, and (f) combination thereof. In an embodiment, the one or more parameters for the one or more price elasticity distributions are computed through the first component approach, further includes: (a) the one or more priors are computed from one or more historical sales data, (b) the one or more likelihoods are determined as a Gaussian distribution with mean and variance of one or more monetary objectives chosen based on the input data for a corresponding selling duration of the one or more products from the one or more historical sales data, and (c) a demand is forecasted based on sales distribution corresponding to one or more products and a sampling posterior price elasticity distribution based on the one or more priors and the one or more likelihoods. In an embodiment, the one or more priors are generated as a Gaussian distribution with mean as a value of price elasticity, a standard error as a variance for one or more independent products, and a covariance matrix for one or more dependent products. In an embodiment, the one or more parameters for the one or more price elasticity distributions are computed through the second component approach further includes: (a) the one or more priors are computed from one or more historical sales data, (b) the one or more likelihoods are determined as a Gaussian distribution with mean and variance of one or more monetary objectives chosen based on the input data for a corresponding selling duration of the one or more products from the one or more historical sales data, and (c) a demand is forecasted based on one or more machine learning models trained on in-season transaction data and the historical sales data corresponding to the one or more products, and the sampling posterior price elasticity distribution based on the one or more priors and the one or more likelihoods. In an embodiment, the one or more priors are generated as a Gaussian distribution with mean as a value of price elasticity, a standard error as a variance for one or more independent products, and a covariance matrix for one or more dependent products. In an embodiment, the one or more parameters for the one or more price elasticity distributions are computed through the third component approach, further includes: (a) the one or more priors are computed from one or more historical sales data, (b) the one or more likelihoods are determined as a Gaussian distribution with mean and variance of one or more monetary objectives chosen based on the input data for a corresponding selling duration of the one or more products from the one or more historical sales data, and (c) a demand is forecasted based on one or more deep learning models trained on in-season transaction data and the one or more historical sales data corresponding to the one or more products, and the sampling posterior price elasticity distribution based on the one or more priors and the one or more likelihoods. In an embodiment, the one or more priors are generated as a Gaussian distribution with mean as a value of price elasticity, a standard error as a variance for one or more independent products, and a covariance matrix for one or more dependent products. In an embodiment, the one or more parameters for the one or more price elasticity distributions computed through the fourth component approach, further includes: (a) the one or more priors are computed from one or more historical sales data, (b) the one or more likelihoods are determined as a Gaussian distribution with mean and variance of one or more monetary objectives chosen based on the input data for a corresponding selling duration of the one or more products from the one or more historical sales data; and (c) a demand is forecasted based on the sales distribution corresponding to the one or more products, and the sampling posterior price elasticity distribution based on the one or more priors and the one or more likelihoods. In an embodiment, the one or more priors are generated as a Gaussian distribution with mean as a value of price elasticity, a standard error as a variance for one or more independent products, and a covariance matrix for one or more dependent products. In an embodiment, a Markov Chain Monte Carlo (MCMC) based sampling is further employed on the posterior price elasticity distribution to compute a representative price elasticity value.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
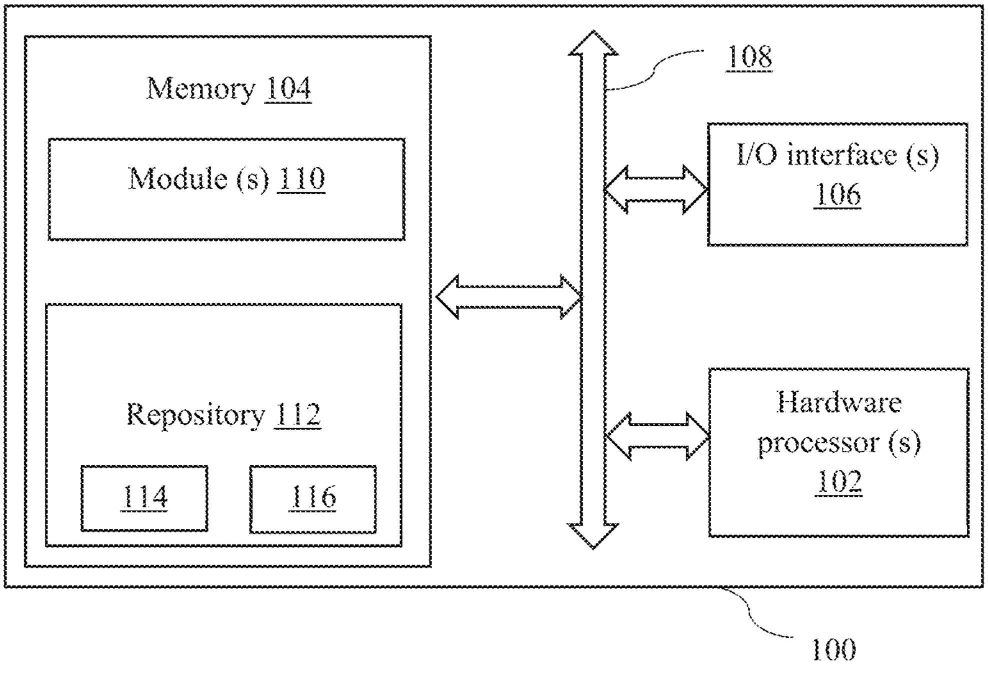
FIG. 1 illustrates a block diagram of a system to compute price elasticity (PE) values for optimal pricing based on a Sequential price elasticity computation using Thompson sampling (SPECTS), according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

There is a need for an approach to compute price elasticity coefficients which are aligned to suitable monetary objectives of a retailer in optimal pricing of products. Embodiments of the present disclosure provide a method and system for computation of price elasticity (PE) values for optimal pricing of products based on one or more unsupervised reinforcement learning models i.e., one or more multi-arm bandit-based approaches e.g., Thompson Sampling. The one or more unsupervised reinforcement learning models may be alternatively referred to as one or more component approaches and vice versa. The one or more unsupervised reinforcement learning models employs one or more multi-arm bandits-based approaches to experiment with one or more price elasticity values to improve sales performance of the product when subject to one or more changes in one or more dynamics of a marketplace. The one or more unsupervised reinforcement learning models are designed for unsupervised learning towards one or more complex user behaviors associated with one or more factors (e.g., one or more market trends,) when a competitive price is offered for the product and even the reward functions are not very apparent. The PE values are defined as a ratio of a percentage change in sales with respect to a percentage change in a price. The embodiment of the present disclosure is configured to develop a model based on sequential price elasticity computation using a Thompson Sampling (SPECTS) model to compute the PE values. Input data such as transaction data, attribute data, inventory data and price master data from source files are pre-processed based on historical transaction data, and the features are derived. The preprocessed data is further processed to select one or more models, in which one or more best fit distributions for sales column are identified. The one or more selected models are utilized to compute prior, and likelihood distributions. Based on the prior and the likelihood distributions chosen, the SPECTS model along with the one or more component approaches i.e., four Thompson Sampling based approaches but not limited to (a) a distribution approximation, (b) Extreme gradient boosting (XGBoost), (c) a generative adversarial network (GAN), differ in terms of demand forecasting component used, and (d) a Markov chain Monte Carlo (MCMC) sampling on posteriors derived to obtain one or more parameters of the price elasticity (PE) distribution. The PE values for a style are obtained based on one or more parameters of the PE distribution. The output from the SPECTS is the ensembled PE value i.e., one or more aggregation techniques such as average value but not limited to a median, a smallest value, a largest value, etc. The ensembled PE value is considered to recommend the optimal price for the products.

Referring now to the drawings, and more particularly to FIGS. 1 through 7, where similar reference characters denote corresponding features consistently throughout the figures, there are shown preferred embodiments, and these embodiments are described in the context of the following exemplary system and/or method.

FIG. 1 illustrates a block diagram of a system 100 to compute price elasticity (PE) values for optimal pricing based on a sequential price elasticity computation using Thompson sampling (SPECTS), according to an embodiment of the present disclosure. In an embodiment, the system 100 includes one or more processor(s) 102, communication interface device(s) or input/output (I/O) interface(s) 106, and one or more data storage devices or a memory 104 operatively coupled to the one or more processors 102. The memory 104 includes a database (Not shown in Figure). The one or more processor(s) processor 102, the memory 104, and the I/O interface(s) 106 may be coupled by a system bus such as a system bus 108 or a similar mechanism. The one or more processor(s) 102 that are hardware processors can be implemented as one or more microprocessors, microcomputers, microcontrollers, digital signal processors, central processing units, state machines, logic circuitries, and/or any devices that manipulate signals based on operational instructions. Among other capabilities, the one or more processor(s) 102 is configured to fetch and execute computer-readable instructions stored in the memory 104. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like. The I/O interface device(s) 106 may include a variety of software and hardware interfaces, for example, interfaces for peripheral device(s), such as a keyboard, a mouse, an external memory, a camera device, and a printer. Further, the I/O interface device(s) 106 may enable the system 100 to communicate with other devices, such as web servers and external databases. The I/O interface device(s) 106 can facilitate multiple communications within a wide variety of networks and protocol types, including wired networks, for example, local area network (LAN), cable, etc., and wireless networks, such as Wireless LAN (WLAN), cellular, or satellite. In an embodiment, the I/O interface device(s) 106 can include one or more ports for connecting number of devices to one another or to another server.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 110 and a repository 112 for storing data processed, received, and generated by the plurality of modules 110. The plurality of modules 110 may include routines, programs, objects, components, data structures, and so on, which perform particular tasks or implement particular abstract data types.

Further, the database stores information pertaining to inputs fed to the system 100 and/or outputs generated by the system (e.g., data/output generated at each stage of the data processing) 100, specific to the methodology described herein. More specifically, the database stores information being processed at each step of the proposed methodology.

Additionally, the plurality of modules 110 may include programs or coded instructions that supplement applications and functions of the system 100. The repository 112, amongst other things, includes a system database 114 and other data 116. The other data 116 may include data generated as a result of the execution of one or more modules in the plurality of modules 110. Further, the database stores information pertaining to inputs fed to the system 100 and/or outputs generated by the system (e.g., at each stage), specific to the methodology described herein. Herein, the memory for example the memory 104 and the computer program code configured to, with the hardware processor for example the processor 102, causes the system 100 to perform various functions described herein under.

Figure 2A:
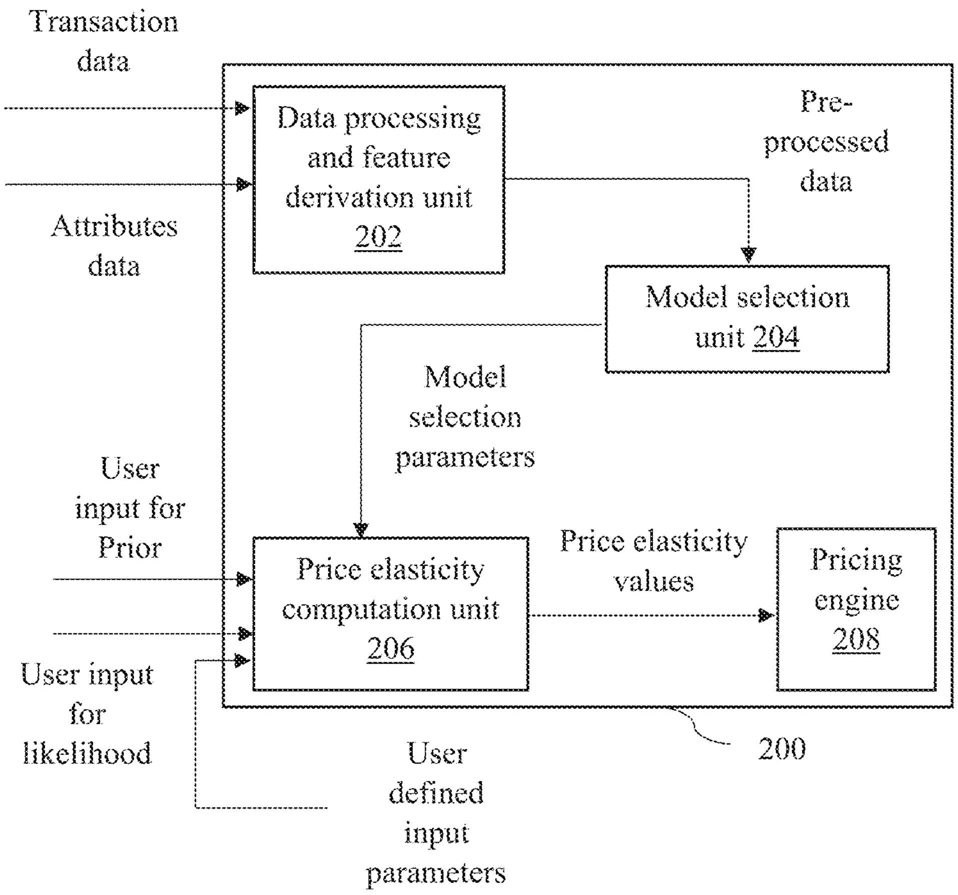
FIG. 2A is an exemplary functional block diagram of the system of FIG. 1, according to an embodiment of the present disclosure.

FIG. 2A is an exemplary functional block diagram of the system 100 of FIG. 1, according to an embodiment of the present disclosure. The system 200 may be an example of the system 100 (FIG. 1). In an example embodiment, the system 200 may be embodied in, or is in direct communication with the system, for example the system 100 (FIG. 1). The system 200 is configured to compute one or more price elasticity (PE) values for optimal pricing of products based on one or more unsupervised reinforcement learning models i.e., one or more multi-arm bandit-based approaches e.g., Thompson Sampling. The one or more unsupervised reinforcement learning models may be alternatively referred to as one or more component approaches, and vice versa. The system 200 includes a data processing and feature derivation unit 202, a model selection unit 204, a price elasticity computation unit 206, and a pricing engine 208. The system 200 receives a transaction data, an attributes data, an inventory data, and a price master data input from source files as one or more inputs. Input data such as transaction data, attribute data, inventory data and price master data are pre-processed based on the historical transaction data, and the features are derived. The transaction data corresponds to one or more transactions recorded when a customer buys a product or a stock keeping unit (SKU) at a particular store on any given day. In an embodiment, the transaction data is recorded in a transaction table including entries for the price corresponding to a product that are purchased and quantity of the product that are purchased along with information pertaining to coupons, clearance, discounts whichever applicable on the given day for the customer at store. Examples of the transaction data are as depicted below in table 1.

TABLE 1

| Transaction date | SKU ID | Store ID | Price | Quantity | Clearance flag | Revenue |
|---|---|---|---|---|---|---|
| Aug. 9, 2022 | A123 | S400 | 2.33 | 1 | 0 | 2.33 |
| Aug. 10, 2022 | A124 | S401 | 2.99 | 2 | 0 | 5.98 |
| Aug. 11, 2022 | A125 | S402 | 3.25 | 1 | 0 | 3.25 |
| Aug. 12, 2022 | A126 | S403 | 5.22 | 1 | 0 | 5.22 |
| Aug. 13, 2022 | A127 | S404 | 4.99 | 1 | 0 | 4.99 |
| Aug. 14, 2022 | A128 | S405 | 4.99 | 2 | 0 | 9.98 |
| Aug. 15, 2022 | A129 | S406 | 6.99 | 3 | 0 | 20.97 |

TABLE 1-continued

| Transaction date | SKU ID | Store ID | Price | Quantity | Clearance flag | Revenue |
|---|---|---|---|---|---|---|
| Aug. 16, 2022 | A130 | S407 | 2.25 | 1 | 0 | 2.25 |
| Aug. 17, 2022 | A131 | S408 | 10.5 | 4 | 0 | 42 |
| Aug. 18, 2022 | A132 | S409 | 2.99 | 4 | 0 | 11.96 |
| Aug. 19, 2022 | A133 | S410 | 3.25 | 3 | 0 | 9.75 |
| Aug. 20, 2022 | A134 | S411 | 4.5 | 2 | 1 | 9 |
| Aug. 21, 2022 | A135 | S412 | 8.5 | 1 | 0 | 8.5 |
| Aug. 22, 2022 | A136 | S413 | 12.5 | 2 | 1 | 25 |

The attributes data corresponds to attribute related information pertaining to a particular product/the SKU and the attribute data is recorded in a product table. The attributes data also corresponds to details related to a hierarchy associated with the product, along with attribute values corresponding to a type/nature of the product. Examples of the attribute data are as depicted below in table 2.

TABLE 2

| SKU ID | Class | Subclass | Category | Gender | Fabric | Length | Sleeves | Color | Price |
|---|---|---|---|---|---|---|---|---|---|
| A123 | C1 | SC1 | Cat1 | Girls | Cotton | Half | Yes | Red | 2.33 |
| A124 | C3 | SC2 | Cat1 | Girls | Cotton | Full | No | Green | 2.99 |
| A125 | C2 | SC4 | Cat2 | Boys | Cotton | Quarter | No | White | 3.25 |
| A126 | C4 | SC3 | Cat4 | Boys | Cotton | Full | No | Yellow | 5.22 |
| A127 | C2 | SC5 | Cat3 | Girls | Cotton | Full | No | Red | 4.99 |
| A128 | C1 | SC7 | Cat3 | Girls | Cotton | Half | No | Blue | 4.99 |
| A129 | C4 | SC3 | Cat4 | Girls | Cotton | Quarter | No | Yellow | 6.99 |
| A130 | C6 | SC2 | Cat2 | Boys | Cotton | Full | No | Yellow | 2.25 |
| A131 | C4 | SC4 | Cat1 | Boys | Cotton | Full | Yes | Yellow | 10.5 |
| A132 | C2 | SC6 | Cat1 | Girls | Muslin | Quarter | Yes | Green | 2.99 |
| A133 | C4 | SC4 | Cat1 | Girls | Muslin | Half | Yes | Blue | 3.25 |
| A134 | C3 | SC4 | Cat2 | Boys | Bamboo | Half | No | Orange | 4.5 |
| A135 | C1 | SC4 | Cat3 | Boys | Cotton | Half | No | Purple | 8.5 |
| A136 | C5 | SC3 | Cat4 | Girls | Bamboo | Full | Yes | Purple | 12.5 |

In an embodiment, the input data from a user may further include phase of sales, a list of the stock keeping unit (SKU), one or more monetary objectives, threshold for estimation scores such as an Akaike Information Criterion (AIC), a Bayesian Information Criterion (BIC)/Mean Squared Error (MSE), threshold for variance, number of SKUs required to satisfy threshold set for variance, number of iterations to wait for a stopping condition to be enforced, a flag input for a prior calculation approach are received.

The data processing and feature derivation unit 202 is configured to pre-process one or more input data by employing one or more techniques for data cleaning, data preprocessing and suitable transformations i.e., the one or more techniques may be slicing or dicing or imputation of NULLs/data aggregation at different levels, or dropping a highly correlated columns, or normalization of numerical features, or transformation of categorical, ordinal feature columns, or combination thereof. For example, the preprocessing steps include: (a) the input data is sliced based on a duration which is chosen and are grouped, (b) concatenating with an inventory table and a store table to compute one or more features e.g., seasonality indices based on the historical transaction data, and (c) log-transformation of one or more key columns i.e., log of price, log of sales, log of previous week sales, and log stock.

The model selection unit 204 is configured to select one or more models based on the preprocessed data. The model selection unit 204 is configured to identify one or more best fit distributions for a sales column at a stock keeping unit (SKU) level. The model selection unit 204 is configured to run one or more component approaches i.e., (a) a first component approach e.g., Thompson sampling with a distribution approximation to obtain the one or more parameters of the PE distribution for the one or more products, if the distribution for the sale column pertains to a family of distributions with one or more conjugacy properties e.g., Poisson-Gamma. For example, Thompson Sampling is utilized for updating the PE values in each learning iteration with demand corresponding to newer price points captured through one or more distributions which are fit on the historical sales data of selected styles in the previous selling season.

In an alternative embodiment, the model selection unit 204 is configured to run one or more component approaches i.e., (b) a second component approach e.g., Thompson sampling in combination with the XGBoost (e.g., a Random Forest), (c) a third component approach e.g., Thompson sampling in combination with GAN based demand forecasting models (e.g., Long Short Term Memory networks (e.g., LSTM), and Artificial neural networks (e.g., ANN)), and a fourth component approach e.g., Thompson sampling in combination with the Markov Chain Monte Carlo (MCMC) sampling, based on the historical transaction data with one or more relevant attributes for obtaining the PE distribution for the one or more products, if the distribution for sales does not pertains to the family of distributions following the one or more conjugacy properties. The Akaike Information Criterion (AIC), Bayesian Information Criterion (BIC), and the Mean Squared Error (MSE) score are computed for one or more selected models. In an embodiment, if one or more selected models have errors below the threshold fixed for the AIC, BIC, and estimation score, and error score, then the flow for one or more selected models is enabled.

Figure 2B:
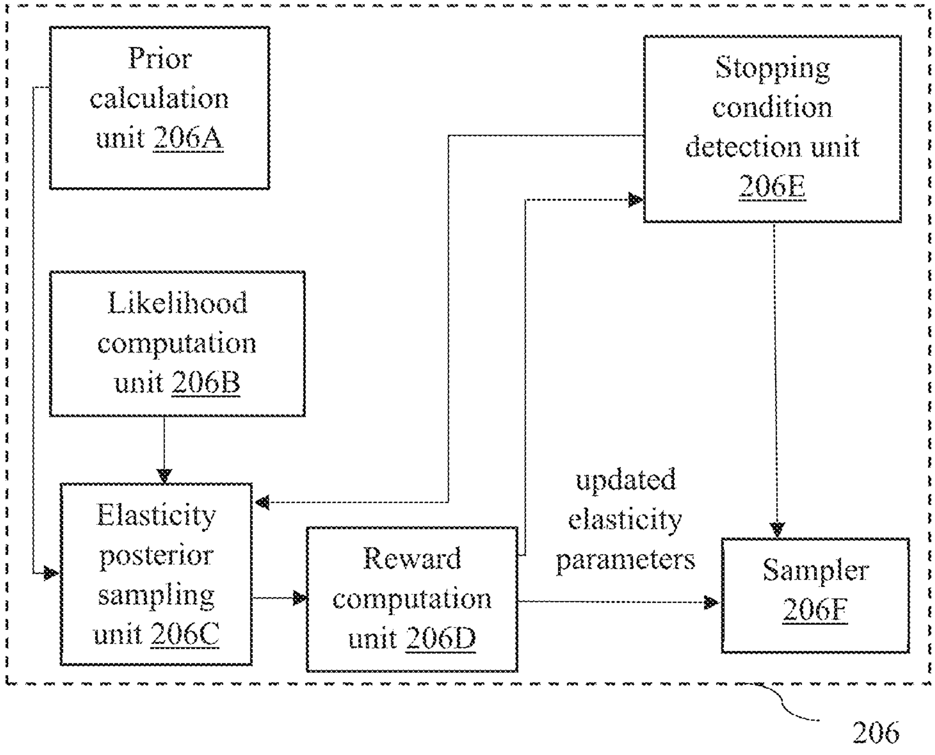
FIG. 2B is an exemplary functional block diagram of a price elasticity computation unit of the system of FIG. 2A, according to an embodiment of the present disclosure.

With reference to FIG. 2B which is an exemplary functional block diagram of a price elasticity computation unit 206 of the system of FIG. 2A, according to an embodiment of the present disclosure. The price elasticity computation unit 206 of the system 200 further includes a prior calculation unit 206A, a likelihood computation unit 206B, an elasticity posterior sampling unit 206C, a reward computation unit 206D, a stopping condition detection unit 206E, and a sampler 206F. The price elasticity computation unit 206 receives the flow of one or more selected models in the SPECTS for prior calculation. The prior calculation unit 206A is configured to compute priors at different groups of data based on data aggregation at different levels. In an embodiment, the different groups of data correspond to (a) previous year, same style, same phase of sales, (b) previous year similar styles same phase of sales, (c) previous year similar styles different phase of sales, (d) previous year based on a particular level in merchandise hierarchy same phase of sales, and (e) previous year based on a particular level in merchandise hierarchy different phase of sales. The priors are utilized at different levels corresponding to the chosen phase of sales. The priors can be captured either at (a) the SKU level with high variance, (b) similar articles level, (c) merchandise hierarchy level, or (d) attribute level. The similar articles level at which the prior is calculated is group of similar products i.e., products sharing similar attribute values e.g., T-Shirts with different colors. The merchandise hierarchy level corresponds to a level based on hierarchy of the product and is mostly present as part of the attributes data. The merchandise hierarchy level at which the prior is calculated (e.g., Ladies apparel, summer collection, Men's clothing, Kids collection. The group of products that must be given the same discount, e.g., products having a similar number of units left in inventory. The group of products that sell similarly e.g., low selling, high selling, medium selling.

The prior calculation unit 206A identifies the phase of sales and corresponding data to be used for the product. In an embodiment, a selling season of the one or more products consists of certain phases like e.g., a regular, a promotion, and a markdown. For example, in the regular phase, products are sold at their full price. For example, in the promotion phase, products are sold at a discounted price, but price reductions are temporary and are applicable only for a specific duration. For example, in the markdown phase, the price reductions are permanent and are applicable until the end of the product lifecycle (e.g., for perishables, a time interval during which they are considered fresh and soon after that quality degradation happens). In an embodiment, the price elasticity of an article varies across the three phases i.e., because of the increasing age of the product, product popularity among the public, and the remaining inventory associated with the product. For example, the priors are captured from the appropriate phase of sales in the previous selling season/similar articles in the previous selling season. In an embodiment, different types of regressors (e.g., a log-log formulation) are run to compute a coefficient of price along with corresponding a standard error. In an embodiment, the coefficient of price may be alternatively referred to as one or more price elasticity values. The log-log formulation to ascertain the values of the price elasticity:

$$\log(Y)=B_0+B_1\log(X)+B_2(Z)+U$$

where, Y is sales, X is price, $B_0$—intercept; $B_1$—Price elasticity value; U—magnitude of error, and Z is a set of one or more features impacting sales of a product.

The prior distribution is obtained by modeling as a Gaussian distribution with one or more parameters derived through the transaction data. The price elasticity value computed is taken as a mean of the Gaussian distribution, and the standard error associated with is taken as a variance of the Gaussian distribution when cross-item effects are ignored. Alternatively, the standard error associated with is taken as a covariance matrix of the Gaussian distribution when cross-item effects need to be considered. Table 3 depicts sample results from regression i.e., the coefficient of log price for each product is taken as the mean of the Gaussian distribution and the standard_error is taken as its variance.

TABLE 3

| Group ID | Feature | Num_point | Coefficient | Rsquared | Within_1_s | Within_2_s |
|---|---|---|---|---|---|---|
| Sku1 | Log_price | 15536 | 0.005259 | 0.0 | 0.79 | 0.92 |
| Sku2 | Log_price | 16827 | — | 0.0 | 0.80 | 0.93 |
| Sku3 | Log_price | 13180 | −0.013450 | 0.0 | 0.80 | 0.93 |
| Sku4 | Log_price | 11477 | −0.063382 | 0.0 | 0.79 | 0.93 |
| Sku5 | Log_price | 14815 | −0.000377 | 0.0 | 0.78 | 0.93 |

| Group ID | Resid_se | Mean_resid | Msg | P_values | Std_error |
|---|---|---|---|---|---|
| Sku1 | 109.19 | 67.38 | na | 5.562872e− | 0.008938 |
| Sku2 | 97.11 | 54.91 | na | 6.790847 | 0.008954 |
| Sku3 | 83.03 | 42.62 | na | 1.227881e− | 0.008715 |
| Sku4 | 238.85 | 140.13 | na | 3.419487e− | 0.008700 |
| Sku5 | 98.33 | 52.61 | na | 9.625666e− | 0.008030 |

In an embodiment, regression models are run on one or more levels with different sets of the one or more input data to determine the one or more priors. A feature set for the regression model includes: (a) log price, (b) seasonality index, (c) clearance flag, (d) week of the year, (e) log previous week sales, (f) log stock, (g) number of stores, and (h) target is taken as a log of sales. In an embodiment, different types of regression models but not limited to i.e., Ridge regression to determine the values of price elasticity, Lasso regression to eliminate all irrelevant features, are used to obtain coefficient of log price when regressed against log sales in the presence of other features. For example, the Lasso model filters out all the features that do not have a significant impact on sales. The Ridge regression is applied to the feature set identified as significant by the Lasso regression. For example, a product in general is associated with a set of different hierarchies. Further, a product might share similar attributes with a set of other products. Accordingly, all such possible groups are identified and assigned with group numbers. For each group, the regression model (e.g., Elastic-Net) is employed to obtain the regression coefficients for log of price, the associated R-squared and the standard error. The coefficients are sorted based on R-squared and pick out that coefficient and std error for which the R-squared are the highest.

In another exemplary embodiment, a decision tree approach is implemented to determine the one or more priors and the steps includes: (a) splitting of the data into two sets i.e., a training set, and a cross-validation set, (b) the price elasticity (PE) coefficients are determined using a regression models (e.g., Elastic net) at different levels using only the training data, (c) the identified price elasticity coefficients are used at weekly level for each item as additional features for the cross validation set and to predict demand, (d) a Random Forest regressor model is employed to obtain feature importance associated with each feature (e.g., the PE at different levels/different phases of data), and (e) the PE coefficient with the highest feature importance are utilized as the mean of the PE prior distribution.

In yet another exemplary embodiment, a weighted combination approach is implemented to determine the one or more priors and the steps include: (a) the training data are split into two sets i.e., training set and cross-validation set, (b) the PE coefficients are determined using the regression models (e.g., Elastic net) at different levels using only the training data, (c) the identified price elasticity coefficients are utilized at weekly level for each item as additional features for the cross validation set and to predict demand, (d) a random forest regressor model is employed to obtain a feature importance associated with each feature (e.g., PE at different levels/different phases of data), (e) a flag variable is considered to check and determine choice of weights: (i) if flag variable is set to zero, then choosing the weights from the Random Forest feature importance after subsequent normalization of weights, and (ii) if flag is set to one, then choosing default weights based on the following hierarchy, i.e., for regular/promotion/markdown phase: (a) the PE computed based on same phase of sales—higher weight (0.9), (b) the PE computed based on same style/SKU in previous years—same phase—higher weight (0.9), (c) the PE computed based on similar styles in previous years—same phase—higher weight (0.8), (d) the PE computed based on similar styles in previous years—different phase—lower weight (0.7), and (e) the PE computed based on styles based on a particular level in merchandise hierarchy—lower weight (0.6). As the levels in the merchandise hierarchy go higher and higher, the weights for the PE computed at those levels go lower and lower. Based on the weights chosen, the weights are multiplied to the PE coefficients, and the weighted combination for the parameters of the prior distribution are utilized. For example, the feature set in the regression models employed are price, previous week sales, seasonality indices, attributes derived based on date-time, flag indicators (i.e., regular/promotion/markdown), holiday indicators, discount percentages, inventory levels, significant attributes (i.e., hierarchy levels/or product attributes), prices of related products.

The likelihood computation unit 206B is configured to choose a likelihood model based on one or more monetary objectives that are chosen and the parameters for the likelihood model are ascertained. A distribution for the likelihood model is constructed based on sales units (or a revenue) sold by the same style or similar styles in a previous markdown (or a regular) season. For example, the likelihood model is fit based on revenue/sales units and on the objective chosen for the respective sales period. If the reward is taken as a revenue gained, then the revenue calculated in that period is used for determination of one or more likelihood parameters. Here, the likelihood is a distribution fit with mean of revenue column and standard deviation of the revenue column as the variance of the distribution. Similarly, if the reward chosen is sales units, then the mean value and the standard deviation value are taken as the parameters of the mean and variance of the Gaussian distribution fit on the sales units. For example, the likelihood parameters correspond to Mean (mu) and variance (i.e., sigma square). One or more parameters of the likelihood computation are obtained using a Gaussian distribution derived from the historical transaction data. Since the one or more monetary objectives corresponds to volume of sales (e.g., revenue), the likelihood is modeled using a Gaussian distribution fit on the sales (e.g., revenue) captured for the selected styles in the markdown (e.g., regular) season.

The elasticity posterior sampling unit 206C is configured to update the distribution parameters associated with the price elasticity coefficients by using Thompson Sampling. In an embodiment, Posterior sampling algorithm is run with the obtained prior and likelihood distributions by a simulator, which is modeled based on one or more selling characteristics of the product or styles within chosen hierarchy. The simulator is required to obtain sales units (e.g., revenue) corresponding to every price point explored. The sales units are modeled as a Poisson process and use corresponding conjugate distribution, the Gamma distribution to perform parameter updates and obtained demand at each iteration of training. The posterior updates in the parameters of the one or more price elasticity distributions are performed using a Bayes rule. The likelihood distribution can correspond to either revenue/sales units. The prior distribution consists of price elasticity coefficients calculated at some higher levels.

Optimization is required to choose one or more price points and for subsequent updates in the distribution associated with the price elasticity coefficients. During each iteration, one or more price points, and corresponding demand along with inventory is sent to an optimization engine, which returns a price probability for each of one or more price points based on the objective and constraints. Further, each component method is bound by an inventory constraint, ensuring that one or more sales units do not exceed inventory. The optimization component drives the TS to explore in a direction that optimizes a particular monetary objective. The monetary objective is to maximize either sales units or revenue corresponding to the chosen phase of sales, and other business rules and constraints. An important feature of the markdown/clearance phase of sales is that the price reduction in this phase is permanent and the prices form a price ladder. The price in consecutive steps (t+1) are not allowed to be greater than the current step (t). The posterior sampling formulation are as provided below:

$$S_t = f_t * \left(\frac{P_t}{P_{t-1}}\right)^{\hat{\beta}} \tag{1}$$

$$R_t = P_t * S_t \tag{2}$$

$$\text{Prior}_0(\hat{\beta}) = N\left(\mu_0, \sum\nolimits_0\right) \tag{3}$$

$$L\left(ObsR_t; R_t, \hat{\beta}\right) = N\left(ObsR_t; R_t, \sigma^2\right) \tag{4}$$

$$L\left(ObsS_t; S_t, \hat{\beta}\right) = N\left(ObsS_t; S_t, \sigma^2\right) \tag{5}$$

$$\text{Posterior}_t\left(\hat{\beta}; R_t\right) \propto \text{Prior}_{t-1}(\hat{\beta}) * N\left(ObsR_t; R_t, \sigma^2\right) \tag{6}$$

$$\text{Posterior}_t\left(\hat{\beta}; S_t\right) \propto \text{Prior}_{t-1}(\hat{\beta}) * N\left(ObsS_t; S_t, \sigma^2\right) \tag{7}$$

Where:

$S_t$ is sales at time 't' in markdown (regular) period $f_t$ is forecasted sales at time 't' in markdown (regular) period $P_t$ is price at time 't' in markdown (regular) period $P_{t-1}$ is price at time 't−1' in markdown (regular) period $\hat{\beta}$ is price elasticity coefficient for markdown (regular) period $R_t$ is revenue at time 't' in regular period $R_{t-1}$ is revenue at time 't−1' in regular period $\text{Prior}_0(\hat{\beta})$ is prior for one or more price elasticity distributions in markdown (regular) period $\mu_0$, $\Sigma_2$, are parameters for the initial prior distribution for markdown (regular) period $L(ObsR_t; R_t, \hat{\beta})$ is the likelihood model fit based on observed revenue in regular period $ObsR_t; R_t, \sigma^2$ are parameters of the likelihood model fit on revenue in regular period $L(ObsS_t; S_t, \hat{\beta})$ is the likelihood model fit based on observed sales in markdown period $ObsS_t; S_t, \sigma^2$ are parameters of the likelihood model fit on sales for markdown period $Prior_t(\hat{\beta})$ is the prior distribution at time 't' in markdown (regular) period $Prior_{t-1}(\hat{\beta})$ is the prior distribution at time 't−1' in markdown (regular) period $Posterior_t(\hat{\beta}; R_t)$ is the posterior distribution at time 't' in regular period $Posterior_t(\hat{\beta}; S_t)$ is the posterior distribution at time 't' in markdown period In an embodiment, the equations (1)-(7) illustrate some of the key computations involved in each of the component methods of SPECTS model. The equation (1) presents the sales units at time 't' as a function of old sales units, prices (at t and t−1) and price elasticity coefficient. The equation (2) represents revenue as a function of price and sales. The equation (3) presents the prior distribution at the beginning of the training. The equation (4) represents the likelihood function fit for the revenue maximization objective in the regular season. The equation (5) represents the likelihood function fit for the sales maximization objective in markdown season. The equations (6) and (7) correspond to the updates in the one or more price elasticity distributions incorporating Bayes rule for the revenue maximization and sales maximization objectives respectively.

For a price chosen, a demand is obtained from the demand forecasting engine trained based on historical sales data. If a reward objective is to maximize sales units, the demand is directly taken as a reward. If the reward objective is revenue maximization, then the reward is taken as price multiplied by sales units. For example, the reward objectives are: (a) Revenue maximization, (b) Sales maximization, and (c) Scaled version of reward (alpha1*revenue+alpha2*sales+alpha3*margin).

The stopping condition detection unit 206E is configured to check for any improvements or changes in the reward calculated in the last 'n' iterations. If there is a negligible change in terms of the reward obtained then further exploration is avoided, and the parameters of the one or more price elasticity distributions are fixed. For example, the distribution parameters of the prior distribution are modified based on the probabilities returned. At every iteration, a stopping condition is checked and if satisfied, the distribution parameters of the one or more price elasticity distributions are no longer updated and are returned. The stopping condition imposed as per the markdown scenario checks for an improvement in sales in the previous 'n' iterations. If there has been no increase in the sales units, the algorithm terminates the parameter updates and the final distribution parameters of the PE distribution are returned to a calling method. The posterior sampling formulation that updates the distribution parameters of the price elasticity coefficients is subject to the stopping condition detection unit 206E to save valuable computing resources by avoiding irrelevant updates. The price elasticity coefficients that get sampled from the modified price elasticity distribution are aligned to the one or more monetary objectives selected by the user. These price elasticity coefficients further facilitate the pricing engine 208 to arrive at more optimal prices efficiently.

In an embodiment, a demand for each style for newly explored price points is obtained by employing an XGBoost model. The XGBoost model approach is utilized to determine one or more parameters for the one or more price elasticity distributions. The priors calculated at a merchandise hierarchy level are considered. The likelihood model is fit on sales/demand for the markdown duration and revenue for the regular duration. The XGBoost model is trained on the historical sales data and the feature set included some key attribute columns commonly associated with the styles in this hierarchy along with temporal features such as seasonality indices. The prior, likelihood computation models along with the optimization models are the same as that of the prior, likelihood computation models obtained based on the Thompson Sampling based on the distribution approximations. In the posterior sampling algorithm, a stopping condition is also imposed based on revenue/sales unit improvements in the last 'n' iterations.

In another embodiment, Thompson Sampling is implemented for determining the one or more parameters for the one or more price elasticity distributions i.e., demand corresponding to newer price points is obtained through a GAN based demand forecasting engine. The GAIN model is trained on the historical sales data which includes a feature set with temporal features such as week numbers, seasonality indices, and attribute values. The GAIN model is trained at a group of styles level, and the styles in the group share similar attribute values. The optimization routine is based on quadratic programming that may utilize a SLSQP solver. The reward at each iteration is calculated using the predictions through GAN based imputation method. Using the GAIN framework, the sales corresponding to the explored price point are treated as missing values and imputed. Based on the reward obtained in each iteration, the parameters associated with the PE distribution are accordingly updated. The prior, likelihood computation models along with the optimization models are the same as that of the prior, likelihood computation models obtained based on the Thompson Sampling based on the distribution approximations. A stopping condition for the posterior sampling algorithm is also imposed based on revenue/sales unit improvements in the last 'n' iterations.

In yet another embodiment, Thompson sampling is implemented for determining the parameters of the PE distribution through Markov Chain Monte Carlo (MCMC) sampling approach. For the prior distribution, PE coefficients at similar attributes level are considered. The likelihood model is fit on sales/demand for the markdown duration and revenue for the regular duration. Further, MCMC sampling approach is utilized to sample meaningful PE coefficients for the one or more price elasticity distributions that tend to have a huge variance even after training for a considerable number of iterations. The prior, likelihood computation models along with the optimization models are the same as that of the prior, likelihood computation models obtained based on the Thompson Sampling based on the distribution approximations. A stopping condition is imposed towards the end of each iteration to check if the distribution updates are resulting in significant improvements in terms of the associated reward. For example, to check if MCMC sampling is to be run on top Epsilon for variance='v'

Minimum no. of SKUs='k'

If there are at least k styles for which the variance is beyond threshold-Run MCMC Sampling on top of TS results Else Obtain final distribution parameters of PE based on one or more selected models.

Endif

The parameters 't', 'v' and 'k' are captured based on user-inputs.

Figure 3:
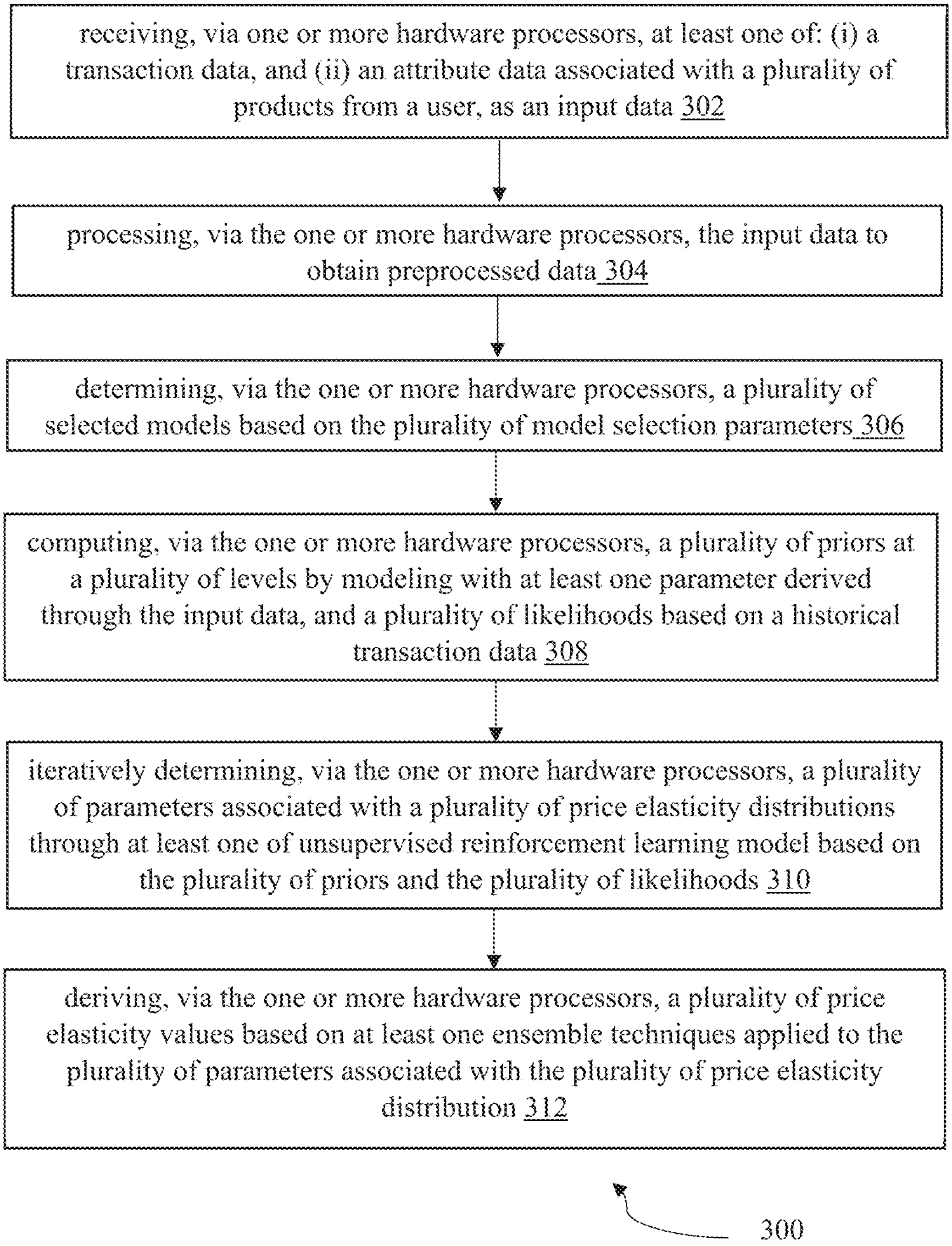
FIG. 3 is an exemplary flow diagram illustrating a method of computing the price elasticity (PE) values for optimal pricing based on the SPECTS at the price elasticity computation unit, according to an embodiment of the present disclosure.

FIG. 3 is an exemplary flow diagram 300 illustrating a method of computing the price elasticity (PE) values for optimal pricing based on the SPECTS at the price elasticity computation unit 206, according to an embodiment of the present disclosure. In an embodiment, the system 100 comprises one or more data storage devices or the memory 104 operatively coupled to the one or more hardware processors 102 and is configured to store instructions for execution of steps of the method by the one or more processors 102. The flow diagram depicted is better understood by way of following explanation/description. The steps of the method of the present disclosure will now be explained with reference to the components of the system as depicted in FIGS. 1, 2A, and 2B.

At step 302, transaction data, or attribute data associated with one or more products, and a combination thereof are received from a user as input data. The input data includes transaction date, a stock keeping unit (SKU) ID, store ID, (d) price, quantity, revenue, phase of sales, SKU list, data associated with one or more monetary objectives, a threshold for Akaike Information Criterion (AIC), and a Bayesian Information Criterion (BIC), error and estimation scores, threshold for variance, number of SKUs required to satisfy threshold set for variance, number of iterations to wait for a stopping condition to be enforced, and a flag input for prior calculation approach. At step 304, the input data is processed to obtain preprocessed data. The preprocessed data includes one or more model selection parameters. At step 306, one or more selected models are determined based on one or more model selection parameters. At step 308, one or more priors are computed at one or more levels by modeling with one or more parameters derived through the input data. One or more likelihoods are computed based on historical transaction data. The one or more priors are computed based on: (a) a SKU level with a high variance, (b) group of similar products, (c) a merchandise hierarchy level, (d) similar selling characteristics of group of products, (e) selling range of group of products, and (f) combination thereof.

At step 310, one or more parameters associated with one or more price elasticity distributions are iteratively determined through the one or more unsupervised reinforcement learning models based on the one or more priors and the one or more likelihoods. The one or more unsupervised reinforcement learning models corresponds to one or more component approaches. The one or more component approaches corresponds to; (a) a first component approach, or (b) a second component approach, or (c) a third component approach, or (d) a fourth component approach, and combination thereof. In an embodiment, the one or more parameters for the one or more price elasticity distributions are computed through the first component approach, further includes: (a) the one or more priors are computed from one or more historical sales data, (b) the one or more likelihoods are determined as a Gaussian distribution with mean and variance of one or more monetary objectives chosen based on the input data for a corresponding selling duration of the one or more products from the one or more historical sales data, and (c) a demand is forecasted based on sales distribution corresponding to one or more products and a sampling posterior price elasticity distribution based on the one or more priors and the one or more likelihoods. In an embodiment, the one or more priors are generated as a Gaussian distribution with mean as a value of price elasticity, a standard error as a variance for one or more independent products, and a covariance matrix for one or more dependent products.

In an embodiment, the one or more parameters for the one or more price elasticity distributions are computed through the second component approach includes: (a) the one or more priors are computed from one or more historical sales data, (b) the one or more likelihoods are determined as a Gaussian distribution with mean and variance of one or more monetary objectives chosen based on the input data for a corresponding selling duration of the one or more products from the one or more historical sales data, and (c) a demand is forecasted based on one or more machine learning models trained on in-season transaction data and the historical sales data corresponding to the one or more products, and the sampling posterior price elasticity distribution based on the one or more priors and the one or more likelihoods. In an embodiment, the one or more priors are generated as a Gaussian distribution with mean as a value of price elasticity, a standard error as a variance for one or more independent products, and a covariance matrix for one or more dependent products.

In an embodiment, the one or more parameters for the one or more price elasticity distributions are computed through the third component approach, further includes: (a) the one or more priors are computed from one or more historical sales data, (b) the one or more likelihoods are determined as a Gaussian distribution with mean and variance of one or more monetary objectives chosen based on the input data for a corresponding selling duration of the one or more products from the one or more historical sales data, and (c) a demand is forecasted based on one or more deep learning models trained on in-season transaction data and the one or more historical sales data corresponding to the one or more products, and the sampling posterior price elasticity distribution based on the one or more priors and the one or more likelihoods. In an embodiment, the one or more priors are generated as a Gaussian distribution with mean as a value of price elasticity, a standard error as a variance for one or more independent products, and a covariance matrix for one or more dependent products.

In an embodiment, the one or more parameters for the one or more price elasticity distributions are computed through the fourth component approach, further includes: (a) the one or more priors are computed from one or more historical sales data, (b) the one or more likelihoods are determined as a Gaussian distribution with mean and variance of one or more monetary objectives chosen based on the input data for a corresponding selling duration of the one or more products from the one or more historical sales data; and (c) a demand is forecasted based on the sales distribution corresponding to the one or more products, and the sampling posterior price elasticity distribution based on the one or more priors and the one or more likelihoods. In an embodiment, the one or more priors are generated as a Gaussian distribution with mean as a value of price elasticity, a standard error as a variance for one or more independent products, and a covariance matrix for one or more dependent products. In an embodiment, a Markov Chain Monte Carlo (MCMC) based sampling is further employed on the posteriors price elasticity distribution to compute a representative price elasticity value. At step 312, one or more price elasticity values are derived based on one or more ensemble techniques applied to the one or more parameters associated with the one or more price elasticity distributions.

An exemplary pseudo code illustrating a computation of the price elasticity for the optimal pricing of one or more products are as mentioned below:

Input—(a) preprocessed data, (b) priors calculated based on chosen phase of sales and chosen level, (c) likelihood calculated based on reward objective.

```
Initialize price elasticity distribution parameters;
for every item i, in chosen subset of items do
  for t=1 to T do
    Prior= prior calculated at chosen level during chosen phase of
  sales
    Likelihood = likelihood based on chosen reward objective
    Price elasticity coefficient distributions α Prior X
  likelihood #update distributions params
    Reward = calculated through sample price elasticity
  coefficient
    if (reward <= Average reward in 'n' iterations): #stopping
  condition
      break
End
```

An exemplary pseudo code illustrating an estimation of the one or more parameters of the one or more price elasticity distributions by the first component approach i.e., the Thompson Sampling with the distribution approximation are as mentioned below:

Input: (a) Pre-processed data, (b) priors calculated based on chosen phase of sales, (c) likelihood calculated based on reward objective.

```
  Initialize: Parameters for the price elasticity distribution, average
reward, and 'n' (iterations for stopping condition)
  for item i = 1, 2, ..., N do
    for t = 1, 2, ...., T do
      Prior = prior calculated at chosen level
      Likelihood = Likelihood fit on chosen reward
      Obtain demand forecast (based on distributions)
      Solve the optimization problem
      Update Posterior (of price elasticity) ∝ Prior * Likelihood
      Reward = reward from sampled price elasticity coefficient
      if Reward < = Average reward in 'n' iterations then
        break
      end if
    end for
    Update price elasticity distribution parameters of the item i
  end for
```

An exemplary pseudo code illustrating an estimation of the one or more parameters of the one or more price elasticity distributions by the second component approach i.e., the Thompson Sampling with the XGBoost demand forecasting are as mentioned below:

Input: (a) Pre-processed data, (b) priors calculated based on chosen phase of sales, (c) likelihood calculated based on reward objective.

```
  Initialize: Parameters for the price elasticity distribution, average
reward, and 'n' (iterations for stopping condition)
  for item i = 1, 2, ..., N do
    for t = 1, 2, ...., T do
      Prior = prior calculated at chosen level
      Likelihood = Likelihood fit on chosen reward
      Obtain demand forecast (from XGBoost demand model)
      Solve the optimization problem
      Update Posterior (of price elasticity) ∝ Prior * Likelihood
      Reward = reward from sampled price elasticity coefficient
      if Reward < = Average reward in 'n' iterations then
        break
```

-continued

```
      end if
    end for
    Update price elasticity distribution parameters of the item i
  end for
```

An exemplary pseudo code illustrating an estimation of the one or more parameters of the one or more price elasticity distributions by the third component approach i.e., Thompson Sampling with the GAN demand forecasting are as mentioned below:

Input: (a) Pre-processed data, (b) priors calculated based on chosen phase of sales, (c) likelihood calculated based on reward objective.

```
  Initialize: Parameters for the price elasticity distribution, average
reward, and 'n' (iterations for stopping condition)
  for item i = 1, 2, ..., N do
    for t = 1, 2, ...., T do
      Prior = prior calculated at chosen level
      Likelihood = Likelihood fit on chosen reward
      Obtain demand forecast (from GAN model)
      Solve the optimization problem
      Update Posterior (of price elasticity) ∝ Prior * Likelihood
      Reward = reward from sampled price elasticity coefficient
      if Reward < = Average reward in 'n' iterations then
        break
      end if
    end for
    Update price elasticity distribution parameters of the item i
  end for
```

An exemplary pseudo code illustrating an estimation of the one or more parameters of the one or more price elasticity distributions by the fourth component approach i.e., Thompson Sampling with the MCMC sampling are as mentioned below:

Input: (a) Pre-processed data, (b) priors calculated based on chosen phase of sales, (c) likelihood calculated based on reward objective.

```
  Initialize: Parameters for the price elasticity distribution, average
reward, and 'n' (iterations for stopping condition)
  for item i = 1, 2, ..., N do
    for t = 1, 2, ...., T do
      Prior = prior calculated at chosen level
      Likelihood = Likelihood fit on chosen reward
      Obtain demand forecast (based on regression models)
      Solve the optimization problem
      Update Posterior (of price elasticity) ∝ Prior * Likelihood
      Reward = reward from sampled price elasticity coefficient
  based on MCMC sampling
      if Reward < = Average reward in 'n' iterations then
        break
      end if
    end for
    Update price elasticity distribution parameters of the item i
  end for
```

Experimental Results

Figure 4:
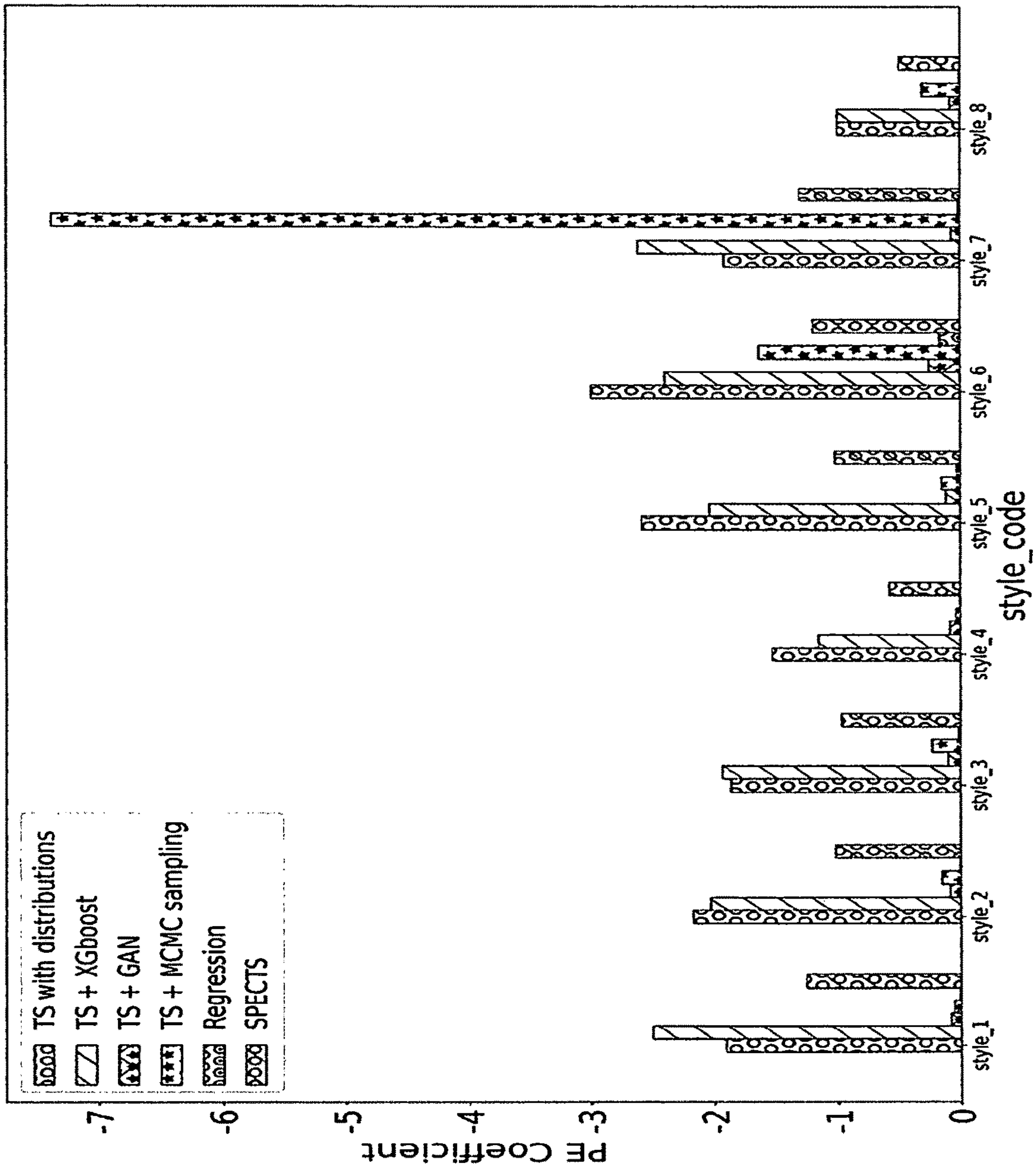
FIG. 4 is an exemplary graphical representation which illustrates comparative results of the price elasticity (PE) values obtained through one or more component approaches with the SPECTS, against one or more conventional approaches, according to an embodiment of the present disclosure.

For example, a study is conducted to compute price elasticity (PE) values for optimal pricing based on the sequential price elasticity computation using Thompson sampling (SPECTS). The experiments were performed for the retailer and results obtained using eight representative styles. The Fall season includes a regular period of 20 weeks from August 2019 and a markdown period of 10 weeks from the 46th week of 2019 to 3rd week of 2020. The performance data is aggregated at a style-store week level for 'A' store and style week level for E-comm. The posterior sampling algorithm may be an online learning model for updating PE distributions based on the sequential feedback obtained from the environment at which the model is deployed. The SPECTS model is used sequentially to update one or more price elasticity distributions enabling the pricing engine to efficiently prescribe optimal prices for multiple markdowns. The price elasticity is provided at a weekly level for obtaining weekly price discounts for multiple markdowns, to satisfy the sell-through requirements. With reference to FIG. 4 is an exemplary graphical representation which illustrates comparative results of the price elasticity (PE) values obtained through one or more component approaches with the SPECTS, against one or more conventional approaches, according to an embodiment of the present disclosure. Table 4 shows the PE values obtained from the four methods in SPECTS compared with the regression method.

TABLE 4

| Style code (SC) | PE value M 1 | PE value M 2 | PE value M 3 | PE value M 4 | PE via Regression | PE via SPECTS |
|---|---|---|---|---|---|---|
| SC1 | −1.91 | −2.5 | −0.08 | −0.05 | 0.01 | −1.25 |
| SC2 | −2.17 | −2.03 | −0.09 | −0.15 | 0 | −1.02 |
| SC3 | −1.87 | −1.94 | −0.1 | −0.23 | −0.01 | −0.97 |
| SC4 | −1.53 | −1.16 | −0.09 | 0.03 | 0 | −0.58 |
| SC5 | −2.59 | −2.04 | −0.12 | −0.15 | −0.03 | −1.02 |
| SC6 | −3 | −2.4 | −0.26 | −1.64 | −0.17 | −1.2 |
| SC7 | −1.92 | −2.62 | −0.08 | −7.39 | 0.01 | −1.31 |
| SC8 | −1 | −1 | −0.09 | −0.31 | 0 | −0.5 |

The x-axis in the graphs represent the different style codes and the y-axis represents PE coefficients which are negative values. The PE value from each method varies for a given style. For example, the average PE value across the four component approaches is considered as a stable output. Averaging leads to a smooth behavior which is more reliable than the individual methods. The PE values produced by M1 and M2 lie within the same range. For other styles, the PE values vary considerably. This is a direct consequence of using machine learning models trained on less data and priors obtained based on fitting regression models on small number of data points. These two factors affect the methods and the magnitude of error cascades. This problem of variation across the methods is addressed by taking the average of the price elasticity values. Before computing the average, the magnitude of errors is examined in the demand forecasting component of each of the methods, as well as the variance of the final PE distribution that each method produces. Then average of PE values may be considered from the methods, the error in demand forecasting component and the variance in the PE distribution are comparatively lesser. In an embodiment, the average PE value is utilized in the pricing engine 208 to obtain optimal price and sales units and compare with the actuals.

Figure 5:
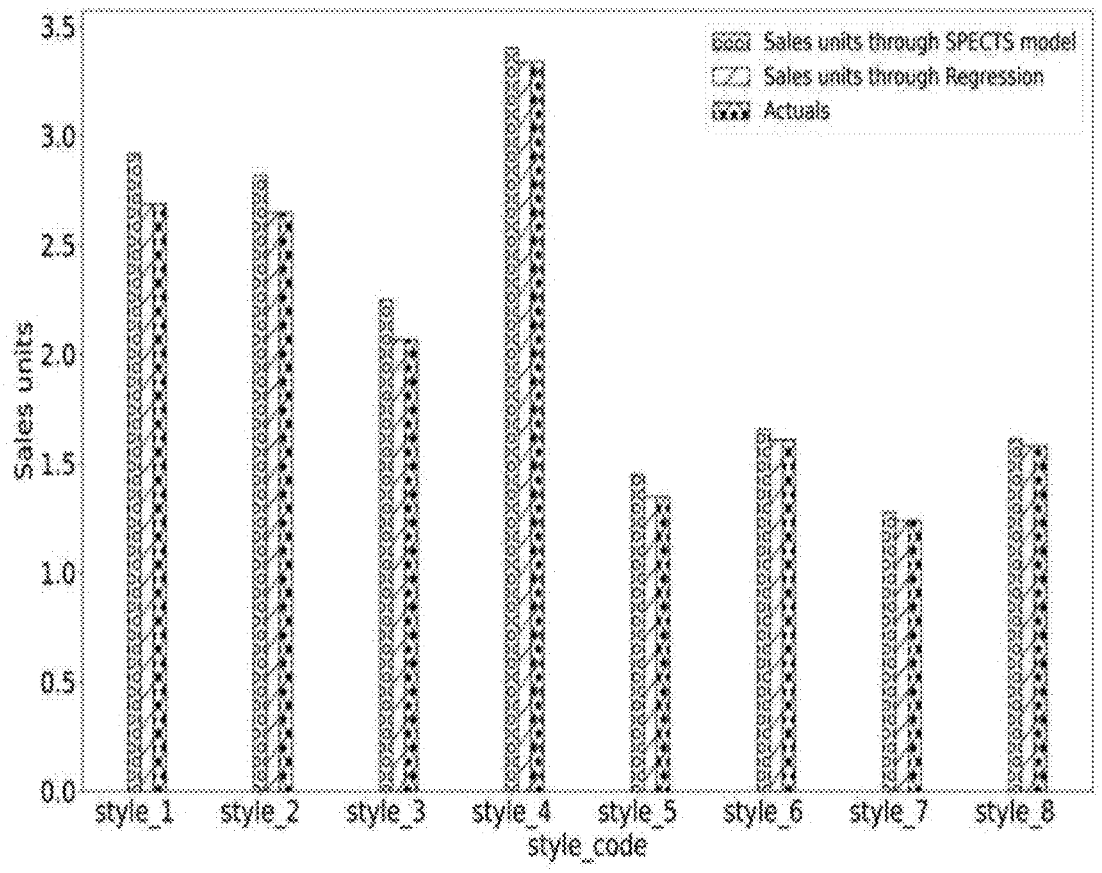
FIG. 5 is an exemplary graphical representation which illustrates comparative results of sales units, obtained through one or more component approaches with the SPECTS for eight styles in e-commerce markdown period, against one or more conventional approaches, according to an embodiment of the present disclosure.

With reference to FIG. 5 is an exemplary graphical representation which illustrates comparative results of sales units obtained through one or more component approaches with the SPECTS for eight styles in e-commerce markdown period and a regular period, against one or more conventional approaches, according to an embodiment of the present disclosure. The x-axis represents the style codes, and the y-axis represents the normalized sales units (e.g., markdown season) at a style level. From the plot, there is an increase in the sales units which is comparatively higher than the one or more conventional approaches i.e., regression methods and the actuals for the respective selling seasons.

Figure 6:
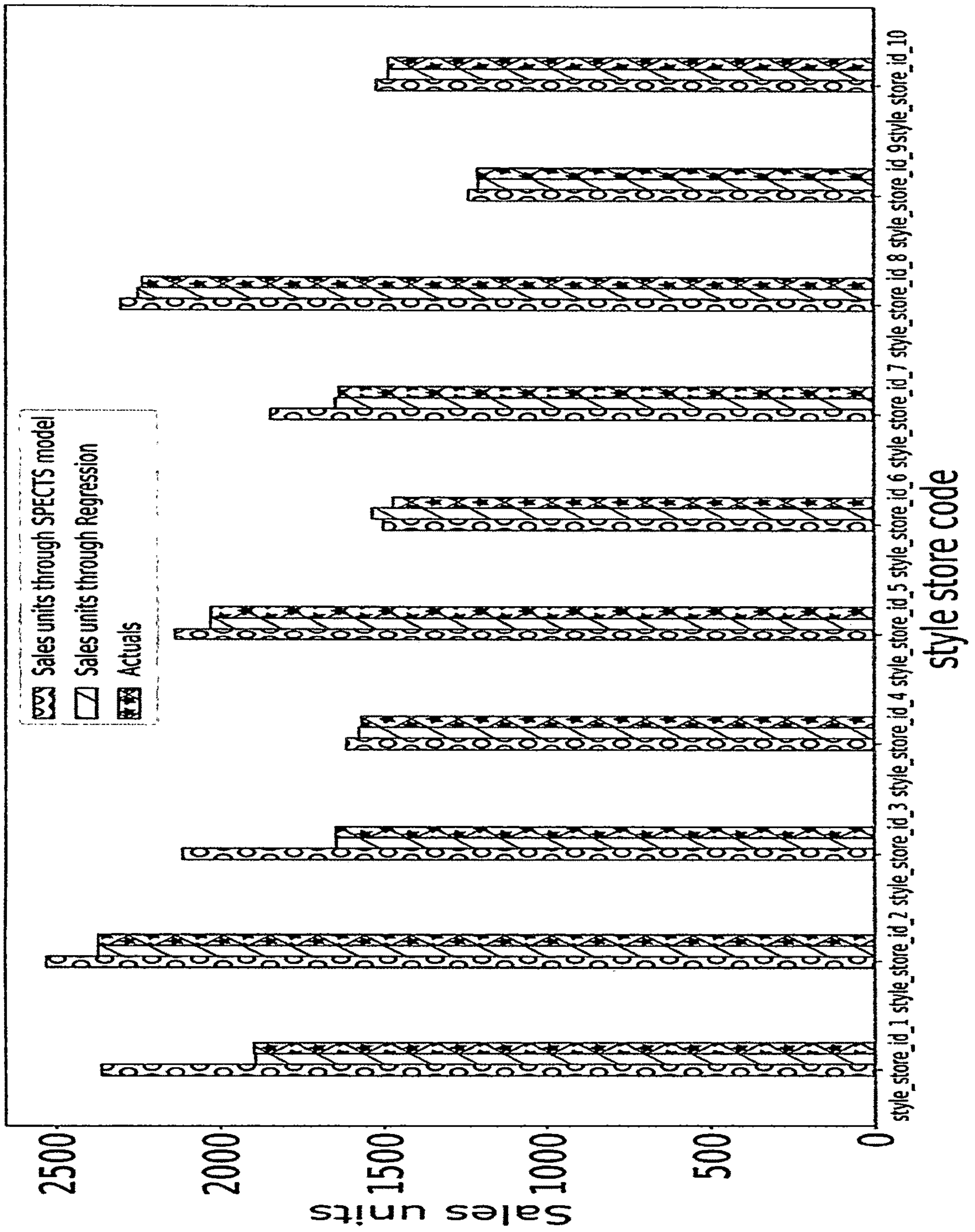
FIG. 6 is an exemplary graphical representation which illustrates comparative results of sales units obtained through one or more component approaches with the SPECTS for different style-store combinations in a markdown season, against one or more conventional approaches, according to an embodiment of the present disclosure.

With reference to FIG. 6 is an exemplary graphical representation which illustrates comparative results of sales units obtained through one or more component approaches with the SPECTS for different style-store combinations in a markdown season, and one or more conventional approaches, according to an embodiment of the present disclosure. TA sales increase of about 2%-7% is obtained, for all stores selling basic styles through SPECTS model with respect to actuals and 13%-28% for stores selling styles tagged to Kids' Fashion during the markdown season for brick-and-mortar stores. The revenue percentage improvements for SPECTS model, regression models, and one or more conventional approaches are compared against actuals in Table 5 for the regular season for different style-store combinations.

TABLE 5

| Style Store Code (SSC) | Revenue percentage w.r.t SPECTS models and actuals | Revenue percentage w.r.t regression model and actuals | Revenue percentage w.r.t other conventional approach and actuals |
|---|---|---|---|
| SSC 1 | −0.14 | 0.13 | −0.62 |
| SSC 2 | 4.52 | −0.19 | 2.34 |
| SSC 3 | 5.94 | −0.09 | −0.71 |
| SSC 4 | −0.14 | −1.01 | −0.7 |
| SSC 5 | 14.56 | 0.57 | −0.45 |
| SSC 6 | −0.14 | 2.67 | −0.27 |
| SSC 7 | 2.07 | −0.87 | 2.98 |
| SSC 8 | 4.45 | 1.34 | −0.11 |
| SSC 9 | −0.16 | −0.46 | −0.82 |
| SSC 10 | −0.13 | −0.47 | 0.19 |

Figure 7:
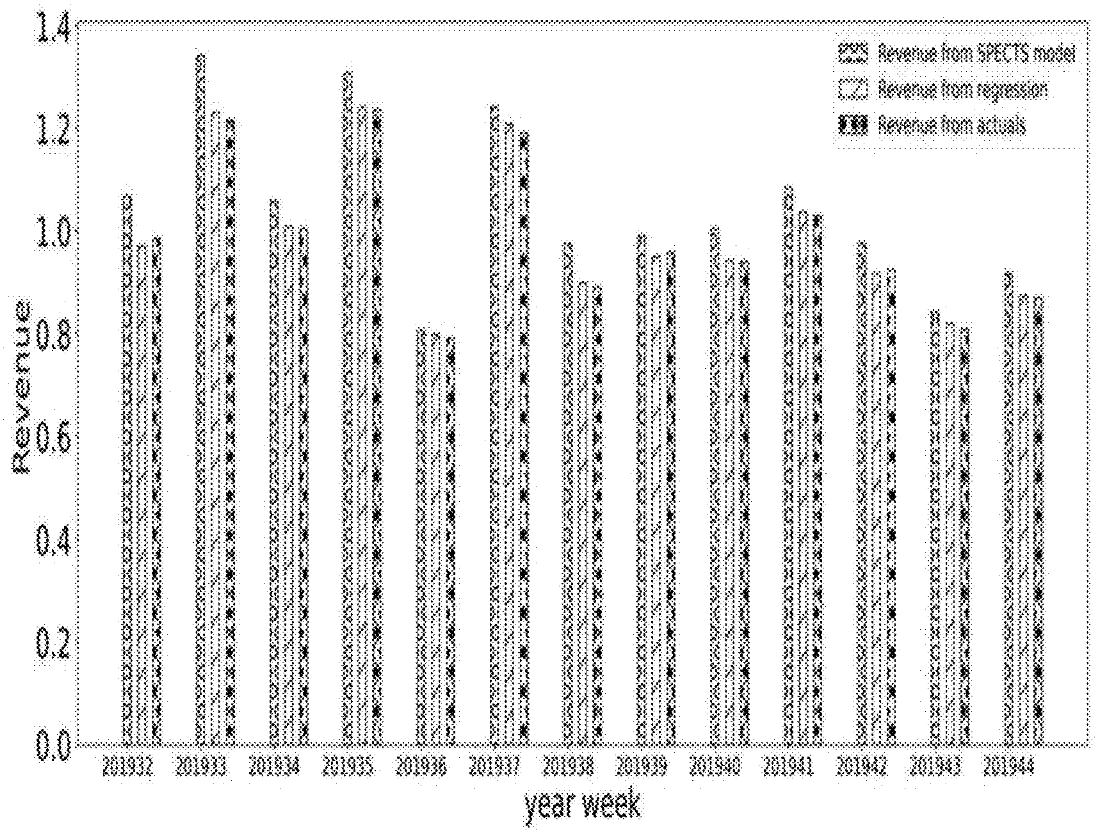
FIG. 7 is an exemplary graphical representation which illustrates comparative results of revenue obtained through one or more component approaches with the SPECTS for a style across weeks in a regular season, against one or more conventional approaches, according to an embodiment of the present disclosure.

With reference to FIG. 7 is an exemplary graphical representation which illustrates comparative results of revenue obtained through one or more component approaches with the SPECTS for a style across weeks in a regular season, and one or more conventional approaches, according to an embodiment of the present disclosure. The x-axis represents the different weeks of a year, and the y-axis represents the sum of revenue obtained with respect to a particular style/style-store across the different weeks in a regular season. The SPECTS model provides comparatively higher revenue compared to regression models and the actuals for the style/style-store considered across different weeks in regular season. Further, FIG. 7 showcases the weekly updates in the PE distribution resulting in sales units (e.g., revenue) increase across different weeks for the markdown (e.g., regular) period considered. This was observed across different styles and style-store combinations and served as a means for validating the model results. The SPECTS model based on Thompson Sampling is utilized for computing price elasticity for a large kids' apparel store chain. The system computes and recommends PE values that lead to optimal pricing and maximum sales units and revenue for markdown and regular pricing, on using the pricing engine 208. The SPECTS system for PE calculation is not specific to seasonal or Fashion retailing but can be applied to all classes of retail products.

The embodiments of the present disclosure herein address unresolved problems of one or more monetary objectives pertaining to optimal pricing for each phase of sales. The embodiments of the present disclosure provide a method and system to compute a price elasticity for optimal pricing of products through one or more multi-arm bandit models. A setting for one or more multi-arm bandit models is appropriate for a problem of computation of price elasticities as encourages both exploration and exploitation over K-arms. The K-arms can correspond to a set of price points that an algorithm could utilize for optimizing some monetary metric of interest. Each of these K-arms are to be chosen with a probability of that arm being optimal. Thompson Sampling is one popular algorithm for a multi-arm bandit problem which doesn't involve any explicit computation of confidence intervals over one or more uncertain parameters and hence is easy to implement. The embodiment of the present disclosure can compute a price elasticity coefficient that addresses one or more monetary objectives pertaining to each phase of sales. The proposed approach includes appropriate one or more monetary objectives, which reduces search spaces considerably and facilitates the pricing engine to recommend the optimal price. The method disclosed can compute the price elasticity for regular season and the objective is to maximize revenue. Further, the method disclosed can compute the price elasticity for the promotion season and the objective is to optimize both revenue and sales units. In addition, the method disclosed can provide an efficient approach to calculate the price elasticity such that the unsold inventory at the end of markdown season is minimized. The optimal prices then drive sales and thereby reduce wastage due to unsold inventory. The method disclosed is capable of forecasting range for demand curves exclusively for the markdown season. The priors can function on items with similar selling characteristics, similar attributes, or any other user defined rules for grouping and offers capability to run at item level. The likelihood can accommodate sales units as well as revenue depending on the inputs from the user.

The method disclosed is capable of continuously employing one or more bandit algorithms to explore along the direction that optimizes the one or more monetary objectives associated with the retailer. As the algorithm starts iterating, the variance of the distribution gets narrower and once the stopping condition is satisfied, the algorithm arrives at a narrower distribution of price elasticity coefficients. Hence, the price elasticity coefficients that are sampled from the distribution lie close to each other. The parameters of this distribution are used to sample price elasticity coefficients. Since these coefficients have already been oriented towards one or more monetary objectives, the optimization engine requires a lesser number of iterations to arrive at the optimized price aligned to the same monetary objective. Thus, the computational solution space and complexity is reduced significantly. The bandit algorithms allow exploration of new price points that are not part of historical sales data and using that estimates price to demand relationship. The proposed algorithm capable of experimenting with the price elasticity coefficients for items with very few sales points, for items with very few price changes in historical sales data and for items with no history. The proposed approach evaluates the current reward with respect to average reward obtained across last 'n' iterations to stop further exploration which helps in avoiding redundant and irrelevant computation.

The SPECTS model consists of four different Thompson Sampling based algorithms for determining the parameters of the PE distribution. Three of the methods, namely, the distribution approximation, the XGBoost regressor, and the GAN, differ in terms of the demand forecasting component used. The fourth method uses the MCMC sampling methods on the posteriors derived using Thompson Sampling. Each of the four methods computes and provides the PE value for a style. The output of SPECTS may be obtained by one or more ensemble techniques i.e., average value of the four methods but not limited to other aggregation strategies such as median, smallest value, largest value, etc. For example, the average PE value is a smoothened version of other PE values. Further, the sales units and revenue are compared with the actuals obtained. The revenue and sales unit improvements obtained using the SPECTS are higher compared with baseline regression methods and actuals for regular and markdown periods. The stopping condition is imposed in each of the four approaches to avoid irrelevant explorations. The incorporation of informative priors and the stopping condition together saves valuable computing resources and facilitates the pricing engine to come up with optimal prices more efficiently. The proposed approach uses non-linear demand update with XGBoost, with the price elasticity calculated through Thompson Sampling, utilizing prior information on price elasticity which helps faster convergence. Further, Sequential Least-squares Programming with gradient information is utilized for faster convergence and is scalable. The proposed approach uses levels of hierarchy and selling patterns for product segmentation.

The optimal prices are subject to one or more business constraints, which result in maximizing sales units and revenue during markdown and regular periods. Hence, the SPECTS model provides a deterministic way of choosing PE for all styles. The PE values computed captures the history as well as the current environment and trends which the regression-based methods do not. The model can be used to compute PE distributions for styles for current and future periods. Thus, capturing the variations occurring across time leads to more representative PE values. In the e-commerce scenario, the SPECTS may be an online learning model and are utilized to compute the PE values dynamically. Once the SPECTS model is set up, then a trigger to continuous updates of the PE distribution is initiated and are valid for future periods. The method disclosed addresses potential bottleneck, which relates to a spike in computation when the style-store combinations increase drastically, by leveraging open-source distributed computing and parallel execution frameworks on cloud for scaling when the number of style-stores increase considerably. The active learning algorithms are utilized to calculate PE coefficients for multiple style-store combinations. The proposed approach is designed to operate for both brick-and-mortar stores and e-commerce. The proposed approach can operate both on in season/historical data pertaining to any phase of sales/selling season. In the proposed approach, the potential bottleneck, which relates to spike in computation when the style-store combinations increase drastically are addressed by leveraging open-source distributed computing and parallel execution frameworks on the cloud for scaling when the number of style-stores increase considerably.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising:

receiving, via one or more hardware processors, at least one of: (i) a transaction data, and (ii) an attribute data associated with a plurality of products from a user, as an input data;

processing, via the one or more hardware processors, the input data to obtain pre-processed data, wherein the pre-processed data comprises a plurality of model selection parameters;

determining, via the one or more hardware processors, a plurality of selected models based on the plurality of model selection parameters;

receiving a flow of the determined plurality of selected models in a sequential price elasticity computation using Thompson sampling for calculation of a plurality of priors;

computing, via the one or more hardware processors, the plurality of priors at different groups of data based on the received flow of the plurality of selected models, wherein the plurality of priors are utilized at different levels corresponding to a chosen phase of sales, wherein the plurality of priors is computed based on at least one of: (a) a SKU level with a high variance, (b) group of similar products, (c) a merchandise hierarchy level, (d) similar selling characteristics of group of products, (e) selling range of group of products, and (f) combination thereof;

training, via the one or more hardware processors, a GAN based demand forecasting engine based on historical sales data which includes a feature set with temporal features such as week numbers, seasonality indices, and attribute values, and the GAN based demand forecasting engine is trained at a group of styles level, and the styles in the group share similar attribute values;

iteratively determining, via the one or more hardware processors, a plurality of parameters associated with a plurality of price elasticity distributions through at least one of unsupervised reinforcement learning model based on the plurality of priors and the plurality of likelihoods, and wherein the at least one of unsupervised reinforcement learning model corresponds to a plurality of component approaches, and wherein the plurality of component approaches corresponds to at least one of (a) a first component approach, or (b) a second component approach, or (c) a third component approach, or (d) a fourth component approach, and combination thereof;

updating the plurality of price elasticity distributions in each iteration with demand corresponding to new price points captured through one or more price elasticity distributions which are fit on historical sales data of selected styles in previous season using the Thompson sampling, wherein during each iteration, one or more price points and corresponding demand along with inventory is sent to an optimization engine, which returns a price probability for each of the one or more price points based on an objective and constraint, and a posterior sampling algorithm modifies the plurality of price elasticity distributions based on the returned price probability;

checking for changes in a reward calculated in last 'n' iterations using the posterior sampling algorithm, wherein when there is a change in terms of the reward obtained further exploration is stopped, and the parameters associated with the one or more price elasticity distributions are fixed, wherein for a price chosen, a demand is obtained from the GAN based demand forecasting engine based on the historical sales data and when a reward objective is to maximize sales units, the demand is directly taken as a reward and when the reward objective is revenue maximization, the reward is taken as price multiplied by sales units, wherein the posterior sampling algorithm is run with the plurality of priors and the plurality of likelihoods by a simulator, which is modeled based on one or more selling characteristics of the product or styles within chosen hierarchy, and the sales units are modeled as a Poisson process and uses corresponding conjugate gamma distribution to perform parameter updates and obtained demand at each iteration of the training, and wherein the posterior sampling algorithm is an online learning model for updating the plurality of price elasticity distributions based on sequential feedback obtained from an environment at which the online learning model is deployed;

validating, via the one or more hardware processors, a magnitude of errors in a demand forecasting component of each of the plurality of component approaches and a variance of a final price elasticity distribution produced by each of the plurality of component approaches, prior to deriving a plurality of price elasticity values, thereby minimizing the errors in the demand forecasting component and the variance in the final price elasticity distribution;

aligning, via the one or more hardware processors, price elasticity coefficients that are sampled from the modified plurality of price elasticity distribution to one or more monetary objectives involving reduced computational solution space and complexity and a lesser number of iterations by the optimization engine to arrive at an optimized price aligned to the same monetary objectives;

deriving, via the one or more hardware processors, the plurality of price elasticity values dynamically based on at least one ensemble technique applied to the plurality of parameters associated with the plurality of price elasticity distributions; and using, via the one or more hardware processors, the derived plurality of price elasticity values in a pricing engine to maximize sales units and revenue for regular and markdown pricing and minimize an unsold inventory at an end of a markdown season by providing optimal pricing for the plurality of products to drive sales and thereby reducing wastage due to the unsold inventory.

2. The processor implemented method of claim 1, wherein the input data comprises:

transaction date, a stock keeping unit (SKU) ID, store ID, (d) price, quantity, revenue, phase of sales, SKU list, data associated with a plurality of monetary objectives, a threshold for Akaike Information Criterion (AIC), and a Bayesian Information Criterion (BIC), error and estimation scores, threshold for variance, number of SKUs required to satisfy threshold set for variance, number of iterations to wait for a stopping condition to be enforced, and a flag input for prior calculation approach.

3. The processor implemented method of claim 1, wherein the step of computing the plurality of parameters for the plurality of price elasticity distributions through the first component approach, comprises: (a) computing, via the one or more hardware processors, the plurality of priors from a plurality of historical sales data, wherein at least one prior is generated as a Gaussian distribution with mean as a value of price elasticity, wherein standard error as variance for at least one independent product, and wherein covariance matrix for at least one dependent product; (b) determining, via the one or more hardware processors, the plurality of likelihoods as a Gaussian distribution with mean and variance of at least one monetary objective chosen based on the input data for a corresponding selling duration of the plurality of products from the plurality of historical sales data; and (c) forecasting, via the one or more hardware processors, a demand based on sales distribution corresponding to a plurality of products, and a sampling posterior price elasticity distribution based on the plurality of priors and the plurality of likelihoods.

4. The processor implemented method of claim 1, wherein the step of computing the plurality of parameters for the plurality of price elasticity distributions through the second component approach, comprises: (a) computing, via the one or more hardware processors, the plurality of priors from a plurality of historical sales data, wherein at least one prior is generated as a Gaussian distribution with mean as a value of price elasticity, wherein standard error as variance for at least one independent product, and wherein covariance matrix for at least one dependent product; (b) determining, via the one or more hardware processors, the plurality of likelihoods as a Gaussian distribution with mean and variance of at least one monetary objective chosen based on the input data for a corresponding selling duration of the plurality of products from the plurality of historical sales data; and (c) forecasting, via the one or more hardware processors, a demand based on at least one machine learning model trained on in-season transaction data and the historical sales data corresponding to the plurality of products, and the sampling posterior price elasticity distribution based on the plurality of priors and the plurality of likelihoods.

5. The processor implemented method of claim 1, wherein the step of computing the plurality of parameters for the plurality of price elasticity distributions through the third component approach, comprises: (a) computing, via the one or more hardware processors, the plurality of priors from a plurality of historical sales data, wherein at least one prior is generated as a Gaussian distribution with mean as a value of price elasticity, wherein standard error as variance for at least one independent product, and wherein covariance matrix for at least one dependent product; (b) determining, via the one or more hardware processors, the plurality of likelihoods as a Gaussian distribution with mean and variance of at least one monetary objective chosen based on the input data for a corresponding selling duration of the plurality of products from the plurality of historical sales data; and (c) forecasting, via the one or more hardware processors, a demand based on at least one deep learning model trained on in-season transaction data and the plurality of historical sales data corresponding to the plurality of products, and the sampling posterior price elasticity distribution based on the plurality of priors and the plurality of likelihoods.

6. The processor implemented method of claim 1, wherein the step of computing the plurality of parameters for the plurality of price elasticity distributions through the fourth component approach, comprises: (a) computing, via the one or more hardware processors, the plurality of priors from a plurality of historical sales data, wherein at least one prior is generated as a Gaussian distribution with mean as a value of price elasticity, wherein standard error as variance for at least one independent product, and wherein covariance matrix for at least one dependent product; (b) determining, via the one or more hardware processors, the plurality of likelihoods by fitting a Gaussian distribution with mean and variance of at least one monetary objective chosen based on the input data for a corresponding selling duration of the plurality of products from the plurality of historical sales data; and (c) forecasting, via the one or more hardware processors, a demand based on sales distribution corresponding to the plurality of products, and the sampling posterior price elasticity distribution based on the plurality of priors and the plurality of likelihoods, and wherein a Markov Chain Monte Carlo (MCMC) based sampling is further employed on the posterior price elasticity distribution to compute a representative price elasticity value.

7. The processor implemented method of claim 1, wherein the plurality of priors is computed using a decision tree approach comprising the steps of: (a) splitting of training data into two sets including a training set, and a cross-validation set, (b) determining price elasticity (PE) coefficients using regression models at different levels using only the training data, (c) using the determined price elasticity coefficients at weekly level for each item as additional features for the cross validation set and to predict demand, (d) obtaining a feature importance associated with each feature by employing a random forest regressor model, and (e) the PE coefficient with a highest feature importance is utilized as a mean of a PE prior distribution.

8. The processor implemented method of claim 1, wherein the plurality of priors is computed using a weighted combination approach comprising the steps of: (a) splitting of training data into two sets including a training set and a cross-validation set, (b) determining price elasticity (PE) coefficients using regression models at different levels using only the training data, (c) utilizing the determined price elasticity coefficients at weekly level for each item as additional features for the cross validation set and to predict demand, (d) obtaining a feature importance associated with each feature by employing a random forest regressor model, (e) checking and determining a choice of weights by considering a flag variable: (i) if flag variable is set to zero, then choosing the weights from the random forest feature importance after subsequent normalization of the weights, and (ii) if flag is set to one, then choosing default weights based on the following hierarchy such as regular/promotion/markdown phase: (a) the price elasticity computed based on same phase of sales, (b) the price elasticity computed based on same style or SKU in previous years and same phase of sales, (c) the price elasticity computed based on similar styles in previous years and same phase of sales, (d) the price elasticity computed based on similar styles in previous years and different phase of sales, and (e) the price elasticity computed based on styles based on a particular level in merchandise hierarchy.

9. The processor implemented method of claim 1, wherein the processing include the steps of: (a) slicing the input data based on a duration which is chosen and are grouped, (b) concatenating with an inventory table and a store table to compute one or more features such as seasonality indices based on the transaction data, and (c) log-transformation of one or more key columns, wherein the different groups of data correspond to (a) previous year, same style, same phase of sales, (b) previous year similar styles same phase of sales, (c) previous year similar styles different phase of sales, (d) previous year based on a particular level in merchandise hierarchy same phase of sales, and (e) previous year based on a particular level in merchandise hierarchy different phase of sales, and wherein the reward at each iteration is calculated using the predictions through GAN based imputation method where the sales corresponding to the new price point are treated as missing values and imputed.

10. The processor implemented method of claim 1, wherein when the plurality of selected models have errors below a threshold fixed for Akaike Information Criterion (AIC), Bayesian Information Criterion (BIC), and the Mean Squared Error (MSE) score, an estimation score and an error score, then the flow of the determined plurality of selected models is enabled, and wherein the processor implemented method leverages open-source distributed computing and parallel execution frameworks on a cloud for scaling when a number of style-stores combinations increase, and the derived plurality of price elasticity values captures history as well as a current environment and trends.

11. A system, comprising:

a memory storing instructions;

one or more communication interfaces; and one or more hardware processors coupled to the memory via the one or more communication interfaces, wherein the one or more hardware processors are configured by the instructions to:

receive, at least one of: (i) a transaction data, and (ii) an attribute data associated with a plurality of products from a user, as an input data;

process, the input data to obtain preprocessed data, wherein the preprocessed data comprises a plurality of model selection parameters;

determine, a plurality of selected models based on the plurality of model selection parameters;

receive a flow of the determined plurality of selected models in a sequential price elasticity computation using Thompson sampling for calculation of a plurality of priors;

compute, a plurality of priors at the different groups of data based on the received flow of the plurality of selected models, wherein the plurality of priors are utilized at different levels corresponding to a chosen phase of sales, wherein the plurality of priors is computed based on at least one of: (a) a SKU level with a high variance, (b) group of similar products, (c) a merchandise hierarchy level, (d) similar selling characteristics of group of products, (e) selling range of group of products, and (f) combination thereof;

train a GAN based demand forecasting engine based on historical sales data which includes a feature set with temporal features such as week numbers, seasonality indices, and attribute values, and the GAN based demand forecasting engine is trained at a group of styles level, and the styles in the group share similar attribute values;

iteratively determine, a plurality of parameters associated with a plurality of price elasticity distributions through at least one of unsupervised reinforcement learning model based on the plurality of priors and the plurality of likelihoods, wherein the at least one of unsupervised reinforcement learning model corresponds to a plurality of component approaches, and wherein the plurality of component approaches corresponds to at least one of (a) a first component approach, or (b) a second component approach, or (c) a third component approach, or (d) a fourth component approach, and combination thereof;

update the plurality of price elasticity distributions in each iteration with demand corresponding to new price points captured through one or more price elasticity distributions which are fit on historical sales data of selected styles in previous season using the Thompson sampling, wherein during each iteration, one or more price points and corresponding demand along with inventory is sent to an optimization engine, which returns a price probability for each of the one or more price points based on an objective and constraint, and a posterior sampling algorithm modifies the plurality of price elasticity distributions based on the returned price probability;

check for changes in a reward calculated in last 'n' iterations using the posterior sampling algorithm, wherein when there is a change in terms of the reward obtained further exploration is stopped, and the parameters associated with the one or more price elasticity distributions are fixed, wherein for a price chosen, a demand is obtained from the GAN based demand forecasting engine based on the historical sales data and when a reward objective is to maximize sales units, the demand is directly taken as a reward and when the reward objective is revenue maximization, the reward is taken as price multiplied by sales units, wherein the posterior sampling algorithm is run with the plurality of priors and the plurality of likelihoods by a simulator, which is modeled based on one or more selling characteristics of the product or styles within chosen hierarchy, and the sales units are modeled as a Poisson process and uses corresponding conjugate gamma distribution to perform parameter updates and obtained demand at each iteration of the training, and wherein the posterior sampling algorithm is an online learning model for updating the plurality of price elasticity distributions based on sequential feedback obtained from an environment at which the online learning model is deployed;

validate a magnitude of errors in a demand forecasting component of each of the plurality of component approaches and a variance of a final price elasticity distribution produced by each of the plurality of component approaches, prior to deriving a plurality of price elasticity values, thereby minimizing the errors in the demand forecasting component and the variance in the final price elasticity distribution;

align price elasticity coefficients that are sampled from the modified plurality of price elasticity distribution to one or more monetary objectives involving reduced computational solution space and complexity and a lesser number of iterations by the optimization engine to arrive at an optimized price aligned to the same monetary objectives;

derive, the plurality of price elasticity values dynamically based on at least one ensemble technique applied to the plurality of parameters associated with the plurality of price elasticity distributions; and use the derived plurality of price elasticity values in a pricing engine to maximize sales units and revenue for regular and markdown pricing and minimize an unsold inventory at an end of a markdown season by providing optimal pricing for the plurality of products to drive sales and thereby reducing wastage due to the unsold inventory.

12. The system of claim 11, wherein the input data comprises: transaction date, a stock keeping unit (SKU) ID, store ID, (d) price, quantity, revenue, phase of sales, SKU list, data associated with a plurality of monetary objectives, a threshold for Akaike Information Criterion (AIC), and a Bayesian Information Criterion (BIC), error and estimation scores, threshold for variance, number of SKUs required to satisfy threshold set for variance, number of iterations to wait for a stopping condition to be enforced, and a flag input for prior calculation approach.

13. The system of claim 11, wherein the one or more hardware processors are configured by the instructions to compute the plurality of parameters for the plurality of price elasticity distributions through the first component approach, further comprises:

(a) compute, the plurality of priors from a plurality of historical sales data, wherein at least one prior is generated as a Gaussian distribution with mean as a value of price elasticity, wherein standard error as variance for at least one independent product, and wherein covariance matrix for at least one dependent product;

(b) determine, the plurality of likelihoods as a Gaussian distribution with mean and variance of at least one monetary objective chosen based on the input data for a corresponding selling duration of the plurality of products from the plurality of historical sales data; and (c) forecast, a demand based on sales distribution corresponding to a plurality of products, and a sampling posterior price elasticity distribution based on the plurality of priors and the plurality of likelihoods.

14. The system of claim 11, wherein the one or more hardware processors are configured by the instructions to compute the plurality of parameters for the plurality of price elasticity distributions through the second component approach, further comprises:

(a) compute, the plurality of priors from a plurality of historical sales data, wherein at least one prior is generated as a Gaussian distribution with mean as a value of price elasticity, wherein standard error as variance for at least one independent product, and wherein covariance matrix for at least one dependent product;

(b) determine, the plurality of likelihoods as a Gaussian distribution with mean and variance of at least one monetary objective chosen based on the input data for a corresponding selling duration of the plurality of products from the plurality of historical sales data; and (c) forecast, a demand based on at least one machine learning model trained on in-season transaction data and the historical sales data corresponding to the plurality of products, and the sampling posterior price elasticity distribution based on the plurality of priors and the plurality of likelihoods.

15. The system of claim 11, wherein the one or more hardware processors are configured by the instructions to compute the plurality of parameters for the plurality of price elasticity distributions through the third component approach, further comprises:

(a) compute, the plurality of priors from a plurality of historical sales data, wherein at least one prior is generated as a Gaussian distribution with mean as a value of price elasticity, wherein standard error as variance for at least one independent product, and wherein covariance matrix for at least one dependent product;

(b) determine, the plurality of likelihoods as a Gaussian distribution with mean and variance of at least one monetary objective chosen based on the input data for a corresponding selling duration of the plurality of products from the plurality of historical sales data; and (c) forecast, a demand based on at least one deep learning model trained on in-season transaction data and the plurality of historical sales data corresponding to the plurality of products, and the sampling posterior price elasticity distribution based on the plurality of priors and the plurality of likelihoods.

16. The system of claim 11, wherein the one or more hardware processors are configured by the instructions to compute the plurality of parameters for the plurality of price elasticity distributions through the fourth component approach, further comprises:

(a) compute, the plurality of priors from a plurality of historical sales data, wherein at least one prior is generated as a Gaussian distribution with mean as a value of price elasticity, wherein standard error as variance for at least one independent product, and wherein covariance matrix for at least one dependent product;

(b) determine, the plurality of likelihoods by fitting a Gaussian distribution with mean and variance of at least one monetary objective chosen based on the input data for a corresponding selling duration of the plurality of products from the plurality of historical sales data; and (c) forecast, a demand based on sales distribution corresponding to the plurality of products, and the sampling posterior price elasticity distribution based on the plurality of priors and the plurality of likelihoods, and wherein a Markov Chain Monte Carlo (MCMC) based sampling is further employed on the posterior price elasticity distribution to compute a representative price elasticity value.

17. One or more non-transitory machine-readable information storage mediums comprising one or more instructions which when executed by one or more hardware processors cause:

receiving at least one of: (i) a transaction data, and (ii) an attribute data associated with a plurality of products from a user, as an input data;

processing the input data to obtain preprocessed data, wherein the preprocessed data comprises a plurality of model selection parameters;

determining a plurality of selected models based on the plurality of model selection parameters;

receiving a flow of the determined plurality of selected models in a sequential price elasticity computation using Thompson sampling for calculation of a plurality of priors;

computing a plurality of priors at the different groups of data based on the received flow of the plurality of selected models, wherein the plurality of priors are utilized at different levels corresponding to a chosen phase of sales, wherein the plurality of priors is computed based on at least one of: (a) a SKU level with a high variance, (b) group of similar products, (c) a merchandise hierarchy level, (d) similar selling characteristics of group of products, (e) selling range of group of products, and (f) combination thereof;

training a GAN based demand forecasting engine based on historical sales data which includes a feature set with temporal features such as week numbers, seasonality indices, and attribute values, and the GAN based demand forecasting engine is trained at a group of styles level, and the styles in the group share similar attribute values;

iteratively determining a plurality of parameters associated with a plurality of price elasticity distributions through at least one of unsupervised reinforcement learning model based on the plurality of priors and the plurality of likelihoods, wherein the at least one of unsupervised reinforcement learning model corresponds to a plurality of component approaches, and wherein the plurality of component approaches corresponds to at least one of (a) a first component approach, or (b) a second component approach, or (c) a third component approach, or (d) a fourth component approach, and combination thereof;

updating the plurality of price elasticity distributions in each iteration with demand corresponding to new price points captured through one or more price elasticity distributions which are fit on historical sales data of selected styles in previous season using the Thompson sampling, wherein during each iteration, one or more price points and corresponding demand along with inventory is sent to an optimization engine, which returns a price probability for each of the one or more price points based on an objective and constraint, and a posterior sampling algorithm modifies the plurality of price elasticity distributions based on the returned price probability;

checking for changes in a reward calculated in last 'n' iterations using the posterior sampling algorithm, wherein when there is a change in terms of the reward obtained further exploration is stopped, and the parameters associated with the one or more price elasticity distributions are fixed, wherein for a price chosen, a demand is obtained from the GAN based demand forecasting engine based on the historical sales data and when a reward objective is to maximize sales units, the demand is directly taken as a reward and when the reward objective is revenue maximization, the reward is taken as price multiplied by sales units, wherein the posterior sampling algorithm is run with the plurality of priors and the plurality of likelihoods by a simulator, which is modeled based on one or more selling characteristics of the product or styles within chosen hierarchy, and the sales units are modeled as a Poisson process and uses corresponding conjugate gamma distribution to perform parameter updates and obtained demand at each iteration of the training, and wherein the posterior sampling algorithm is an online learning model for updating the plurality of price elasticity distributions based on sequential feedback obtained from an environment at which the online learning model is deployed;

validating a magnitude of errors in a demand forecasting component of each of the plurality of component approaches and a variance of a final price elasticity distribution produced by each of the plurality of component approaches, prior to deriving a plurality of price elasticity values, thereby minimizing the errors in the demand forecasting component and the variance in the final price elasticity distribution;

aligning price elasticity coefficients that are sampled from the modified plurality of price elasticity distribution to one or more monetary objectives involving reduced computational solution space and complexity and a lesser number of iterations by the optimization engine to arrive at an optimized price aligned to the same monetary objectives;

deriving the plurality of price elasticity values dynamically based on at least one ensemble technique applied to the plurality of parameters associated with the plurality of price elasticity distributions; and using the derived plurality of price elasticity values in a pricing engine to maximize sales units and revenue for regular and markdown pricing and minimize an unsold inventory at an end of a markdown season by providing optimal pricing for the plurality of products to drive sales and thereby reducing wastage due to the unsold inventory.

* * * * *